US012598203B2

(12) United States Patent
Guduri et al.

(10) Patent No.: US 12,598,203 B2
(45) Date of Patent: Apr. 7, 2026

(54) ANALYZING AND RECOMMENDING ROGUE CLASSIFICATION POLICIES FOR A COMMUNICATION NETWORK

(71) Applicant: Hewlett Packard Enterprise Development LP, Spring, TX (US)

(72) Inventors: Sreecharan Guduri, Bangalore (IN); Sekhar Karimbedu, Bangalore (IN); Gururaj Pralhad Cowkur, Bangalore (IN); Pradeep Kumar Golakonda, Bangalore (IN); Venkata Sandeepu Lade, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 203 days.

(21) Appl. No.: 18/360,613

(22) Filed: Jul. 27, 2023

(65) Prior Publication Data

US 2025/0039203 A1    Jan. 30, 2025

(51) Int. Cl.
*G06F 21/55* (2013.01)
*G06F 18/2415* (2023.01)
*H04L 9/40* (2022.01)

(52) U.S. Cl.
CPC ...... *H04L 63/1425* (2013.01); *G06F 18/2415* (2023.01)

(58) Field of Classification Search
None
See application file for complete search history.

(56) References Cited

U.S. PATENT DOCUMENTS

| | | | |
|---|---|---|---|
| 7,295,831 | B2 | 11/2007 | Coleman et al. |
| 8,677,497 | B2 | 3/2014 | Basavapatna et al. |
| 9,198,118 | B2 | 11/2015 | Larue et al. |
| 9,826,399 | B2 | 11/2017 | Peterson et al. |
| 10,257,215 | B2 | 4/2019 | Watson et al. |
| 11,057,946 | B2 | 7/2021 | Swami et al. |
| 12,200,001 | B2 * | 1/2025 | Zhang ................... G06F 16/285 |
| 2004/0255167 | A1 | 12/2004 | Knight |

(Continued)

FOREIGN PATENT DOCUMENTS

CN              106101061 A   * 11/2016   ........... H04L 63/145

*Primary Examiner* — Christopher B Robinson

(74) *Attorney, Agent, or Firm* — Slater Matsil, LLP

(57) ABSTRACT

In certain embodiments, a method performed by a processing device includes obtaining, at multiple times, rogue classification information for electronic devices detected within a communication network. The rogue classification information for each time includes: timestamp information identifying the time; corresponding sets of attribute values for the electronic devices detected within the communication network at the time; and respective rogue classifications, as determined according to active rogue classification policies and the corresponding sets of attribute values, for the electronic devices. The method includes analyzing the rogue classification information for the multiple times to determine whether to modify the active rogue classification policies by analyzing, using a statistical machine learning algorithm, the respective rogue classifications and the corresponding sets of attribute values for the electronic devices for the multiple times. The method includes generating, in response to determining to modify the active rogue classification policies, a recommended rogue classification policy.

20 Claims, 7 Drawing Sheets

(56)        References Cited

U.S. PATENT DOCUMENTS

| | | | |
|---|---|---|---|
| 2007/0178841 | A1 | 8/2007 | Oliynyk et al. |
| 2008/0186932 | A1 | 8/2008 | Do et al. |
| 2013/0291063 | A1 | 10/2013 | Escamilla et al. |
| 2018/0027006 | A1* | 1/2018 | Zimmermann ..... H04L 63/0227 |
| | | | 726/11 |
| 2018/0234302 | A1* | 8/2018 | James .................... G06N 20/00 |
| 2020/0007391 | A1* | 1/2020 | Yang ...................... G06N 20/00 |
| 2022/0201042 | A1* | 6/2022 | Crabtree ............. G06F 16/2477 |
| 2022/0303805 | A1* | 9/2022 | Raghuramu ........ H04L 63/1433 |

* cited by examiner

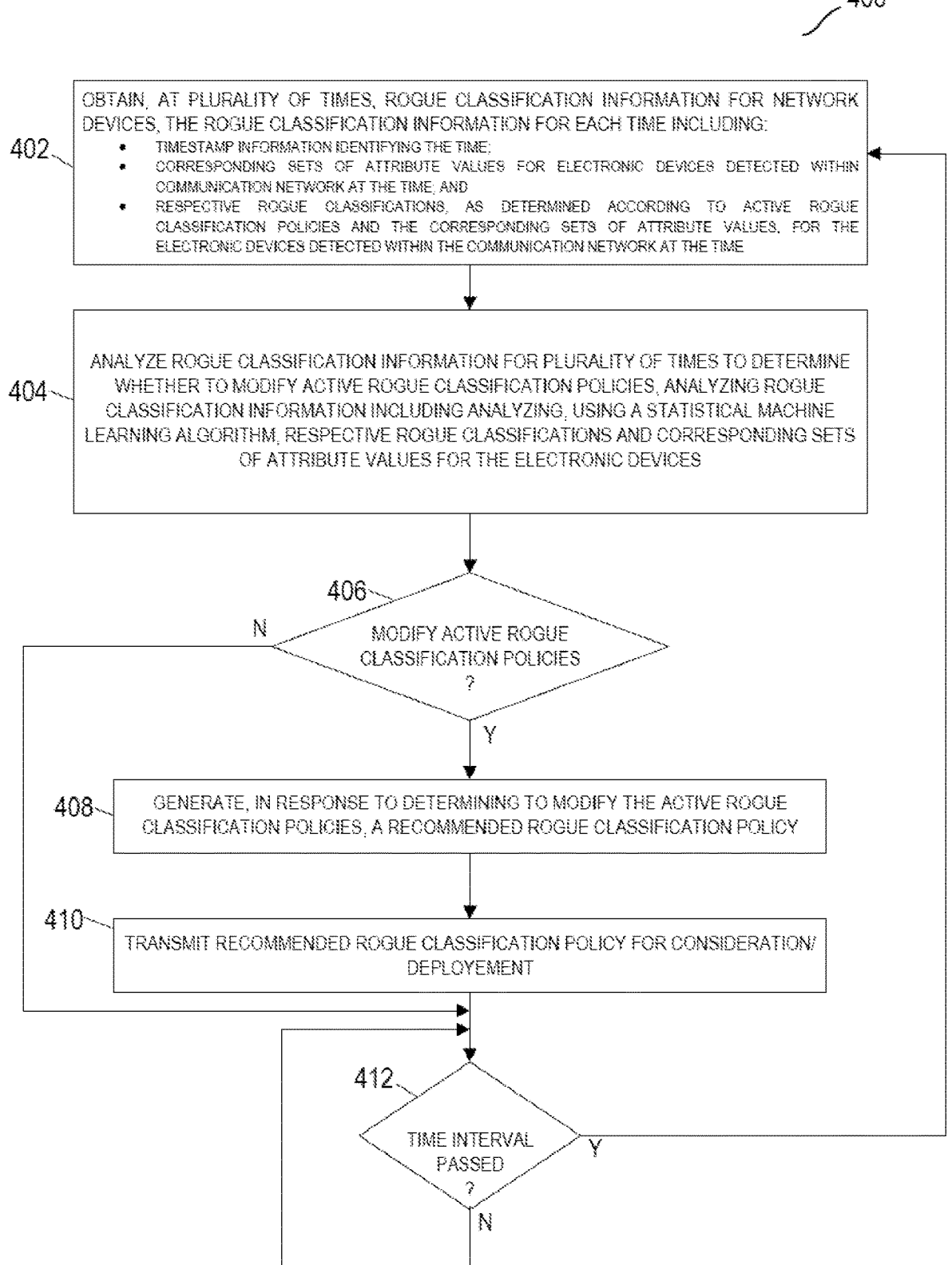

400

OBTAIN, AT PLURALITY OF TIMES, ROGUE CLASSIFICATION INFORMATION FOR NETWORK DEVICES, THE ROGUE CLASSIFICATION INFORMATION FOR EACH TIME INCLUDING:
- TIMESTAMP INFORMATION IDENTIFYING THE TIME;
- CORRESPONDING SETS OF ATTRIBUTE VALUES FOR ELECTRONIC DEVICES DETECTED WITHIN COMMUNICATION NETWORK AT THE TIME; AND
- RESPECTIVE ROGUE CLASSIFICATIONS, AS DETERMINED ACCORDING TO ACTIVE ROGUE CLASSIFICATION POLICIES AND THE CORRESPONDING SETS OF ATTRIBUTE VALUES, FOR THE ELECTRONIC DEVICES DETECTED WITHIN THE COMMUNICATION NETWORK AT THE TIME

402

ANALYZE ROGUE CLASSIFICATION INFORMATION FOR PLURALITY OF TIMES TO DETERMINE WHETHER TO MODIFY ACTIVE ROGUE CLASSIFICATION POLICIES, ANALYZING ROGUE CLASSIFICATION INFORMATION INCLUDING ANALYZING, USING A STATISTICAL MACHINE LEARNING ALGORITHM, RESPECTIVE ROGUE CLASSIFICATIONS AND CORRESPONDING SETS OF ATTRIBUTE VALUES FOR THE ELECTRONIC DEVICES

404

406          MODIFY ACTIVE ROGUE
N          CLASSIFICATION POLICIES
?
Y

GENERATE, IN RESPONSE TO DETERMINING TO MODIFY THE ACTIVE ROGUE CLASSIFICATION POLICIES, A RECOMMENDED ROGUE CLASSIFICATION POLICY

408

TRANSMIT RECOMMENDED ROGUE CLASSIFICATION POLICY FOR CONSIDERATION/ DEPLOYEMENT

410

412          TIME INTERVAL
PASSED          Y
?
N

FIGURE 4

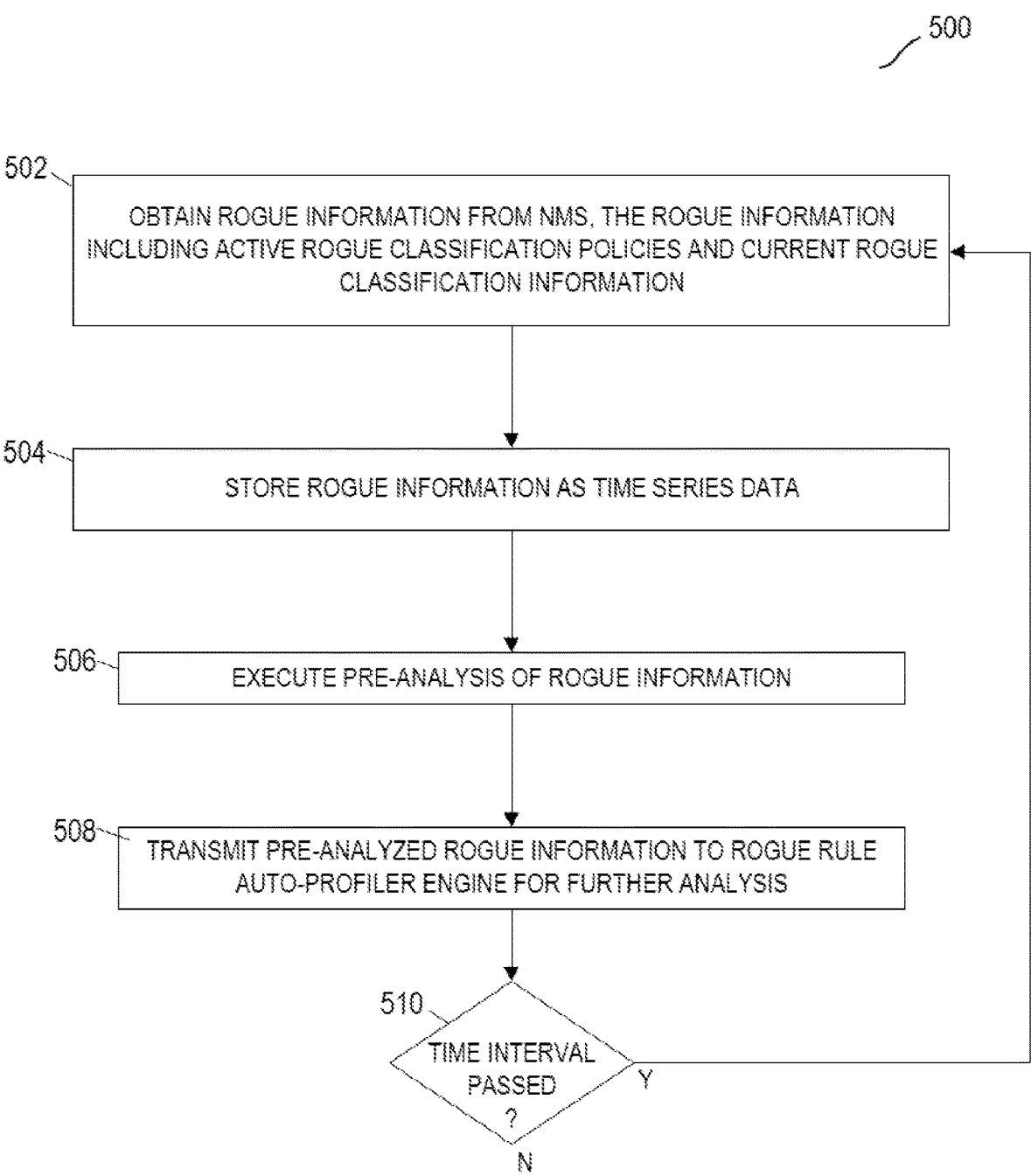

500

502 OBTAIN ROGUE INFORMATION FROM NMS, THE ROGUE INFORMATION INCLUDING ACTIVE ROGUE CLASSIFICATION POLICIES AND CURRENT ROGUE CLASSIFICATION INFORMATION

504 STORE ROGUE INFORMATION AS TIME SERIES DATA

506 EXECUTE PRE-ANALYSIS OF ROGUE INFORMATION

508 TRANSMIT PRE-ANALYZED ROGUE INFORMATION TO ROGUE RULE AUTO-PROFILER ENGINE FOR FURTHER ANALYSIS

510 TIME INTERVAL PASSED ? Y N

FIGURE 5

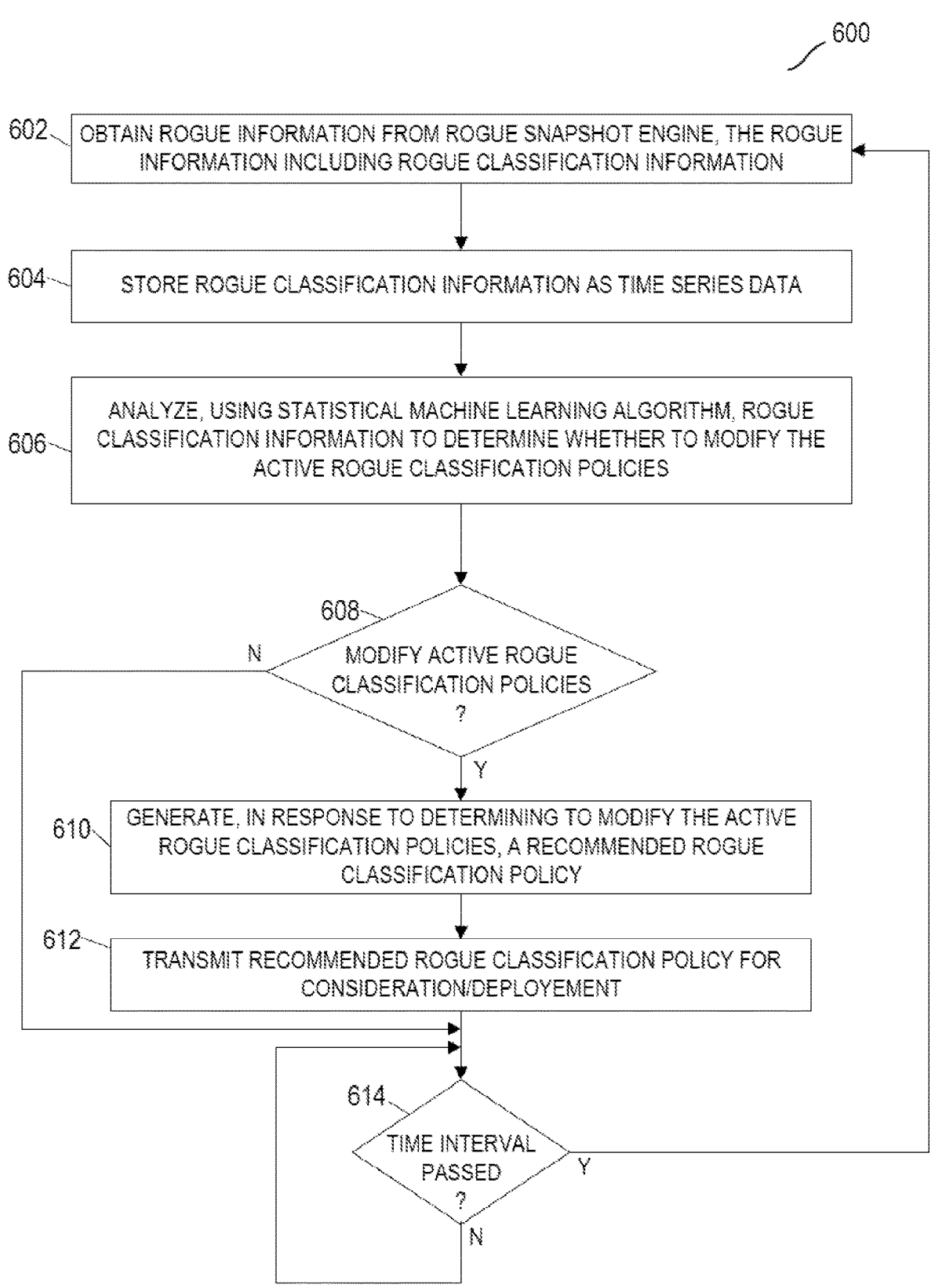

_600_

602 — OBTAIN ROGUE INFORMATION FROM ROGUE SNAPSHOT ENGINE, THE ROGUE INFORMATION INCLUDING ROGUE CLASSIFICATION INFORMATION

604 — STORE ROGUE CLASSIFICATION INFORMATION AS TIME SERIES DATA

606 — ANALYZE, USING STATISTICAL MACHINE LEARNING ALGORITHM, ROGUE CLASSIFICATION INFORMATION TO DETERMINE WHETHER TO MODIFY THE ACTIVE ROGUE CLASSIFICATION POLICIES

608 — MODIFY ACTIVE ROGUE CLASSIFICATION POLICIES ?

N

Y

610 — GENERATE, IN RESPONSE TO DETERMINING TO MODIFY THE ACTIVE ROGUE CLASSIFICATION POLICIES, A RECOMMENDED ROGUE CLASSIFICATION POLICY

612 — TRANSMIT RECOMMENDED ROGUE CLASSIFICATION POLICY FOR CONSIDERATION/DEPLOYEMENT

614 — TIME INTERVAL PASSED ?

ANALYZING AND RECOMMENDING ROGUE CLASSIFICATION POLICIES FOR A COMMUNICATION NETWORK

BACKGROUND

A communication network includes various electronic devices that are able to communicate with one another via one or more communication interfaces. For example, a wireless local area network (WLAN) is a wireless computer network that links two or more electronic devices using a wireless distribution technique (e.g., radio or infrared signals). A WLAN typically is implemented within a limited area such as a home, college, school, or an office complex.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 4 illustrates an example method for analyzing and recommending rogue classification policies for a communication network, according to certain embodiments;

FIG. 5 illustrates an example method for analyzing rogue classification policies for a communication network, according to certain embodiments;

FIG. 6 illustrates an example method for analyzing and recommending rogue classification policies for a communication network, according to certain embodiments.

DETAILED DESCRIPTION OF ILLUSTRATIVE EMBODIMENTS

Figure 1:
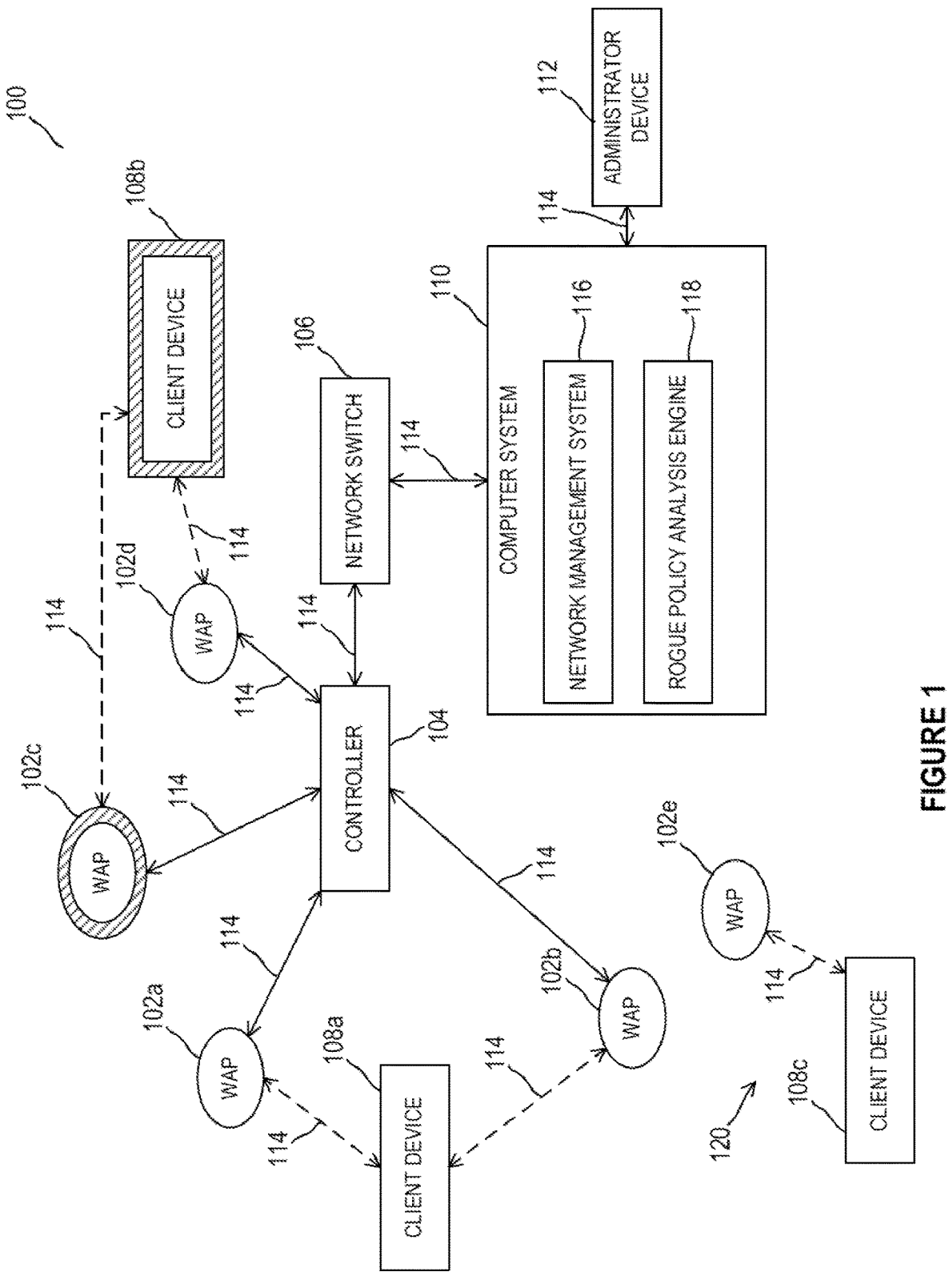
FIG. 1 illustrates an example computing environment for analyzing and recommending rogue classification policies in a communication network, according to certain embodiments.

A communication network, some or all of which may be a wireless network, may include numerous electronic devices, such as client devices, access points (APs), controllers, and switches. A WLAN communication network, for example, may include numerous electronic devices, such as one or more client devices, one or more wireless APs (WAPs), one or more WLAN controllers, and one or more network switches.

A WLAN or other communication network may be monitored via one or more network management systems (NMSs), which may be coupled to WLAN switches and/or WLAN controllers. The one or more NMSs may be used to maintain and secure a network. For example, an NMS may manage electronic devices connected to the communication network. Among other operations, whether for network security or for other purposes, the NMS may detect and monitor electronic devices that are coupled to the communication network or otherwise detectable by other electronic devices in the communication network. The information (e.g., attribute information) related to various electronic devices may be aggregated at various points within the communication network and reported to the NMS.

In communication networks, a rogue device includes a device that connects, potentially over an extended time period, to a computer network but does not have permission to access and operate on the network. In a wireless communication network, rogue wireless devices may be access points, dynamic host configuration protocol (DHCP) servers, end user devices (e.g., rogue peers), or other electronic devices.

Rogue APs may include WAPs installed in a network without authorization. These WAPs (e.g., routers) may be installed by an employee for work purposes, by a hacker for the collection of private records, or in another manner. In most cases, the use of such devices conflicts with network security policies, and the rogue WAPs are not managed by the network administrator responsible for managing the communication network. Rogue WAPs may allow other unauthorized end user devices to connect to the network and consume network bandwidth or perform other unwanted or nefarious operations.

Another example of a rogue WAP is a so-called "evil twin." In this example, a wireless device just outside of an organization may receive beacons transmitted by legitimate WAPs within the organization. The evil twin then may begin to transmit identical beacons, potentially with the intent for end users within the organization to connect to the evil twin rather than, or in addition to, a legitimate WAP. Once an end user is connected to the evil twin, the evil twin can be used by nefarious individuals as an avenue into the organization's network.

Client device rogue threats, or rogue peers, include end user computers or other electronic devices that are connected to a network without permission. These devices may include laptops or other computers that can serve as APs. Rogue peers may pose more risk than rogue APs, given that many client devices (e.g., laptops) have little to no security features. This can allow other unauthorized devices to connect to the device and network.

For example, a rogue peer may refer to a client device, such as an end-user laptop or desktop personal computer, that has both wireless and potentially bridging functionalities enabled. While a WAP (e.g., a router) may provide both WAP and bridging functionality, WAPs typically are configured with authentication protocols like wired-equivalent privacy (WEP) and Wi-Fi protected setup (WPS), and may even implement firewalls. A client device offering both capabilities may pose a greater threat to the security of a network because unlike most WAPs, the client device likely has almost no security measures to reduce or prevent unauthorized access. In other words, rogue peers may be analogous to holes in a communication network where malicious entities might gain access to the communication network. Client devices are not considered part of the network infrastructure, which may suggest treating client devices as rogues depending on other attributes of the client devices. That is, because a rogue peer may be a device generally not meant to serve as an AP, the vulnerability that a rogue peer poses to the communication network may be heightened relative to a rogue AP because rogue APs likely will at least have built-in security features that may have been enabled by default.

Turning to DHCP servers, DHCP servers may be a fundamental component of a communication network, providing information for properly configuring the communication network. Rogue DHCP servers may appear and generally behave similarly to legitimate DHCP servers, but rogue DHCP servers are not managed by the network administrator or associated administration tools. For example, a rogue DHCP server may appear when a user knowingly or unknowingly connects a router to the communication network. As another example, a rogue DHCP server may appear via a compromised Internet-of-things (IoT) device such as a mobile phone, printer, camera, tablet, smartwatch, or via a compromised information technology (IT) application or resource. Although potentially problematic in numerous scenarios, rogue DHCP servers may be particularly frustrating when attempting to deploy a fleet of servers using a Preboot execution Environment (PXE), as PXE typically depends on DHCP. A rogue DHCP server may be a security risk, and a communication network may begin experiencing outages, as the rogue DHCP server can provide incorrect network settings and routes.

A rogue wireless device is one of the leading security threats in wireless networking. If left connected, a rogue wireless device can pose security threats to networks and organizations. For example, a rogue device may have the ability to access and/or disclose confidential system information that is potentially damaging to an organization.

Applying strict network security polices can reduce or eliminate rogue wireless device threats. APs, client devices, and other electronic devices are mapped in the network, facilitating detection of devices that are new to the network. Rogue wireless devices often are detectable but difficult to eliminate. Wi-Fi network administrators monitor for rogue devices over a Wi-Fi network using NMSs that implement the network security policies. Among other operations, an NMS identifies, configures, monitors, and updates network management devices, one or more network switches, one or more WLAN controllers, one or more APs (e.g., WAPs), and/or one or more client devices.

Network administrators may learn intruder behavior (e.g., behavior of rogues) and configure policies to blacklist devices that are unauthorized to connect to the network. This process is repetitive across a customer's network. Additionally, rogue device classification is configured manually based on events generated by a network controller (e.g., a WLAN controller) to northbound systems, such as to an NMS. Additionally, NMSs may employ rogue classification policies that include rules for classifying devices as valid devices, rogue devices, suspected rogue devices, interfering devices, or other types of devices (or other analogous categories). These policies often consider complex combinations of device attributes, network topology information, event information (e.g., attack vector), or other information in determining a classification for a particular electronic device.

The complex combinations of network and device attributes that lead to a particular device being categorized as a rogue wireless device (or other category of device) inhibit meaningfully evaluating the performance of active rogue classification policies that are being applied by the NMS. Thus, network administrators often are left to select from standard, predefined rogue classification policies (potentially with some limited ability to configure certain policy attributes by a skilled network administrator) that might or might not be performing well in classifying detected electronic devices on a network.

Embodiments of this disclosure provide a rogue policy analysis engine, which may be implemented as a rogue snapshot engine and a rogue rule auto-profiler engine, to evaluate, over time, the performance of active rogue classification policies enforced by a network element, such as an NMS, and potentially provide a recommended rogue classification policy to be added to the active rogue classification policies or to update an existing rogue classification policy. The rogue policy analysis engine may be implemented as part of an NMS, or may be implemented separately and communicate with the NMS.

In certain embodiments, on an ongoing basis, an NMS (or other suitable electronic device) applies active rogue classification polices for classifying electronic devices detected within a communication network and stores the determined classifications.

The rogue snapshot engine periodically stores the active rogue classification policies, as well as rogue classification information that includes the classifications assigned, according to the active rogue classification policies, to electronic devices detected in the network and the conditions around those classification (e.g., classification policy(ies) that triggered the classifications, electronic device attributes (internet protocol (IP) address, media access control (MAC) address, service set identifier (SSID), basic service set identifier (BSSID), vendor, device type, etc.), event details (e.g., attack vector and detection frequency), and network topology information. The rogue snapshot engine also may perform some initial analysis of the collected classification information, such as to attempt to verify the assigned classifications and identify certain anomalies in the data.

A rogue rule auto-profiler engine further analyzes the rogue classification information, as analyzed by the rogue snapshot engine, and the active rogue classification policies to evaluate the performance of the active rogue classification policies and determine whether to recommend a modified or new rogue classification policy. For example, based on the received classification information, the auto-profiler engine may assign a threat rating to an electronic device and analyze the classification information using various statistical machine learning algorithms (e.g., data correlation methodologies and/or probability methodologies) to generate an evaluation of the rogue classification for the particular device. If the auto-profiler engine determines to recommend a rogue classification policy, then the auto-profiler engine generates a recommended rogue classification policy, which can be automatically deployed or communicated to the network administrator for further evaluation/configuration.

Certain embodiments improve techniques for identifying rogue devices in a wireless network by evaluating the performance of active rogue classification policies and generating recommended rogue classification policies, where appropriate. Because the evaluation is performed on an ongoing basis and uses statistical machine learning algorithms, the evaluation evolves over time according to actual network events and may improve both performance of the evaluation and rogue classification performance. Certain embodiments improve the technical ability of a computer system to identify rogue devices in a more reliable and accurate manner, thereby enhancing the overall security of the computer network. Certain embodiments reduce or eliminate manual intervention by network administrators or others for implementing and/or updating rogue classification policies. The concepts described in this disclosure can be applied to any type of networking environment, not just a WLAN environment. For example, the concepts may be applied to a wireless network, a wired network, or a network that includes a combination of wireless and wired devices.

FIG. 1 illustrates an example computing environment 100 for analyzing and recommending rogue classification policies in a communication network, according to certain embodiments. In an example, computing environment 100 may include a WLAN. As just one example, the WLAN may include an Institute of Electrical and Electronics Engineers (IEEE) 802.11 WLAN. IEEE 802.11 is a set of MAC and physical layer (PHY) specifications for implementing WLAN computer communication.

In the illustrated example, computing environment 100 includes WAPs 102a-102e (referred to collectively as WAPs 102), a WLAN controller 104, a network switch 106, client devices 108a-108c (referred to collectively as client devices 108), a computer system 110, and an administrator device 112. Although FIG. 1 illustrates computing environment 100 having particular numbers of WAPs 102, WLAN controllers 104, network switches 106, client devices 108, computer systems 110, and administrator devices 112, this disclosure contemplates other implementations that include greater or fewer of each of these network elements, including omitting certain network elements, if appropriate.

WAPs 102 may each include a device, such as a wireless router, that allows wireless devices (e.g., client devices 108) to connect to the WLAN implemented by some or all of computing environment 100. WAPs 102 may each act as radio transmitters for a WLAN. WAPs 102 may each translate network traffic into radio signals and transmit those signals to wireless enabled processing devices. For example, WAPs 102 may each act as a bridge to a wired local area network (LAN). In the illustrated example, WAPs 102 may each be connected to a wired network via WLAN controller 104, which in turn may be coupled to a cable in order to allow wireless enabled computers (e.g., client devices 108) access to a wired network.

WLAN controller 104 may be configured to manage traffic on the WLAN, including, for example, control and data traffic. WLAN controller 104 may gather control plane data and provide instructions to individual WAPs 102. WLAN controller 104 may be configured to manage various aspects related to WAPs 102, such as authentication, radio frequency, Quality of Service (QOS), location tracking, intrusion detection, facilitation of user roaming between/ among WAPs 102, deployment of security profiles, access segregation, and/or any other suitable aspects. WLAN controller 104 may allow WAPs 102 to connect to a wired network via a network switch 106. Network switches 106 may include any suitable combination of layer 2 or layer 3 switches.

Client devices 108 may represent any type of computing device capable of reading machine-executable instructions. Examples of the computing device may include a server, a desktop computer, a notebook computer, a tablet computer, a thin client, a mobile device, a personal digital assistant (PDA), a smart phone, or any other suitable type of computing device. In certain embodiments, client device 108 may include a wireless network interface (e.g., a wireless network interface card (NIC)) that allows client device 108 to perform wireless communication with another device, such as one or more WAPs 102.

Computer system 110 may include a computer and/or a computer program that may process requests from other computers (e.g., clients) over a network. In certain embodiments, computer system 110 is implemented as a server or other suitable type of processing device. Computer system 110 may facilitate monitoring and otherwise managing the communication network (e.g., the WLAN network) implemented by computing environment 100.

An administrator device 112 may be configured to communicate with computer system 110 to facilitate management of the communication network implemented by computing environment 100. Although illustrated separately, computer system 110 and administrator device 112 may be implemented using the same computer system or may be implemented using separate processing devices that communicate via one or more links 114. As an example, a user of administrator device 112 may be one or more individuals responsible for managing the communication network (e.g., WLAN network) implemented by computing environment 100, such as a network administrator or other IT professional.

The components of computing environment 100 may communicate with one another using one or more links 114. Links 114 may include any suitable combination of wired or wireless communication links, such as any suitable combination of an Ethernet connection, a Wi-Fi connection, a cellular connection, a satellite link, or the like. In the illustrated example, links 114 shown as dashed lines are considered to be wireless connections, and links 114 shown as solid lines are considered to be wired connections. Although particular links 114 are shown to be wired or wireless for purposes of this example, this disclosure contemplates any of links 114 being wired and/or wireless, as may be appropriate for a given implementation.

Computer system 110 may include an NMS 116 and a rogue policy analysis engine 118, each of which are described in greater detail below.

NMS 116 may be any suitable system, such as a cloud-based system, that includes one or more computing devices that are configured to manage networks and electronic devices such as network switches, routers, access points, gateways, client devices, and the like. For example, NMS 116 may be configured to manage WAPs 102, controller 104, network switch 106, and client devices 108. NMS 116 may connect to such electronic devices via a wide area network (WAN) (e.g., the Internet) via wired or wireless connections, such as may be implemented by one or more links 114.

NMS 116 may be configured to manage a communication network of an entity, such as an organization, a business, a company, a department, and the like. In certain embodiments, because the entity uses NMS 116 to manage its communication network, the entity is a customer of NMS 116 and may accordingly have a customer account at NMS 116 associated with the entity. An entity may register its electronic devices with NMS 116 so that NMS 116 can identify the electronic devices and/or the entity to which an electronic device belongs. By identifying the entity to which an electronic device belongs, NMS 116 may be able to manage the electronic device according to any rules associated with the entity.

NMS 116 may apply network management policies to manage the communication network and the devices that are detected within the communication network. For various reason, including the security of the communication network implemented by computing environment 100, NMS 116 may attempt to identify, classify, and track devices that are connected to or otherwise detected within the communication network implemented by computing environment 100. For example, over time, devices (e.g., network switches 106, controllers 104, client devices 108, or other devices) may connect to and disconnect from the communication network implemented by computing environment 100. Some of these devices may be known to NMS 116, while others may be unknown. Thus, NMS 116 may detect, identify, categorize, and monitor over time devices that connect to or are otherwise detectable within the network.

To that end, the network management policies applied by NMS 116 may include rogue classification policies. NMS 116 may apply these rogue classification policies to classify devices detected within computing environment 100. The rogue classification policies may define a set of rules that are used to determine an appropriate category for a detected device.

To determine an appropriate category for a device, these rogue classification policies may consider one or more attributes. These attributes may include one or more of device attributes (e.g., physical device attributes and/or virtual device attributes), activity attributes (e.g., relating to the behavior of detected devices), network topology information, timestamp information, and/or any other suitable information. As particular examples, the one or more device attributes may include an IP address of the device, a MAC address of the device, an SSID of the device, a BSSID of the device, a vendor of the device, device type, or any other suitable attribute. The activity attributes may include a time, a point of entry, or the like. The point of entry, for example, may include the device of computing environment 100 to which the detected device connects or attempts to connect. In the case of the detected device being a rogue device, the point of entry may be referred to as an attack vector.

The particular classifications applied by a given NMS 116 may vary, and this disclosure contemplates using any suitable rogue classifications and associated rogue classification policies for determining the applicable rogue classifications for devices detected within a network, such as the communication network implemented by computing environment 100. Thus, the particular classifications may vary with different implementations. Furthermore, the particular rogue classification policies that lead to different classifications may vary with different implementations. Table 1 below provides just one example of potential rogue classifications and associated descriptions. These particular rogue classifications and associated descriptions are provided as examples only.

TABLE 1

| Classification | Description |
| --- | --- |
| Valid | Based on one or more attributes, this device is determined to be authorized to connect to the communication network implemented by computing environment 100. For example, the device may be a WAP and may belong to the same entity as the network element that detected this WAP. Valid devices are accepted as non-threatening and considered part of the same network (e.g., WLAN) infrastructure for the entity associated with the network. |
| Rogue | A rogue device may include an electronic device that connects to, and remains connected to, the communication network implemented by computing environment 100 but that does not have authorization to access and/or operate on the communication network. The rogue device might or might not be detectable within the communication network. For example, a rogue device may be an electronic device in the communication network implemented by computing environment 100 that can be heard over the air (e.g., wireless traffic for a particular BSSID is detected) and can be detected on a wired connection (e.g., by either correlating the wired connection MAC address to the wireless BSSID or by using heuristics to determine that client devices associated to that BSSID are communicating with entities on a wired connection). Rogues are considered a security threat. In the case of an AP, rogue APs may be a security threat because rogue APs may act as a man-in-the-middle, sniffing traffic passing from the wireless client devices to and from the wired network. A rogue AP might give an "attacker" access to data that the attacker could use for nefarious purposes. Of course, any of the devices detected within the communication network implemented by computing environment 100 (not just APs) could be considered a rogue device. |
| Suspect Rogue/ Suspected Rogue | These types of electronic devices are considered a possible security threat. Due to attributes associated with the electronic device, the device (e.g., a client device, a WAP, etc.) may be considered suspicious. For example, the signal strength may be very high, meaning the device potentially is on premises, or some unusual traffic has been detected going to or from the device. As another example, the wired MAC address may not have been correlated to a wireless BSSID, leading to uncertainty as to whether the device is a rogue device. |
| Interfering | These types of electronic devices are not considered a security threat yet. Interfering devices may be associated with BSSID, and the BSSID may be just another BSSID that can be heard over the air but over which the network administrator (or associated management tools) lacks control. Rogue detection algorithms may continue to be applied to this device to reduce or eliminate the chances of the device becoming a security threat. |
| Neighbor | These types of electronic devices are not considered a security threat. For example, this device (e.g., a WAP) may have a well-known BSSID that is known to be benign. An example may be an WAP for the Wi-Fi at a neighboring coffee shop. The BSSID is consistently present and known not to be a threat to the communication network. |

TABLE 1-continued

| Classification | Description |
|---|---|
| | In certain embodiments, a "Neighbor" classification is set via a manual procedure, such that the network administrator has authority to mark an AP or other device as a "Neighbor" (e.g., as a non-threat). In certain embodiments, the identity-aware proxy (IAP)/common alerting protocol (CAP) lacks authority to automatically classify a detected AP or other device as a "Neighbor." Of course, other implementations are possible. |

The attributes that may be pertinent for a given rogue classification policy that is being applied by NMS 116 may vary from device type to device type. In other words, for any given rogue classification policy, the one or more attributes that are evaluated for that rogue classification policy might (or might not) vary based on the type of device that is detected/tracked and being evaluated according to that rogue classification policy. Additionally or alternatively, the acceptable attribute values (which could be specific values, ranges, or other types of values) for the attributes of a rogue classification policy may be defined for the rogue classification policies and also could vary from device type to device type, if appropriate.

For example, a particular rogue classification policy configured for a switch (e.g., network switch 106) might not apply and/or might be configured differently for a client device 108. As another example, a particular rogue classification policy that is configured for wireless devices (e.g., for radio attributes) might not apply and/or might be configured differently for wired devices. As another example, a particular rogue classification policy configured for a device that communicates using a particular communication standard (e.g., 802.11ax, or Wi-Fi 6) might not apply and/or might be configured differently for a device that does not support that particular communication standard.

Although described as being applied at NMS 116, additionally or alternatively, one or more other devices in computing environment 100 may apply rogue classification policies, and may report those determinations to NMS 116. For example, WAPs 102, controller 104, network switch 106, and/or client devices 108 may apply rogue detection policies, if appropriate.

FIG. 1 illustrates examples of certain electronic devices that have been classified according to the above classifications. In certain embodiments, NMS 116 classifies electronic devices according to the above rogue classifications according to one or more active rogue classification policies and one or more attributes associated with the electronic devices and/or the communication network implemented by computing environment 100.

For example, WAPs 102a, 102b, and 102d; controller 104; network switch 106; and client device 108a may be considered valid devices. For example, these valid devices may be known to NMS 116 and considered approved for connection to the communication network implemented by computing environment 100.

As another example, both WAP 102c and client device 108b are classified as rogue devices, as represented by the diagonal shading around the border of these devices. In certain embodiments, client device 108b is connected to computing environment 100 via one or more of WAP 102 and/or WAP 102d. In an example scenario, client device 108b is connected to computing environment 100 via WAP 102c, and NMS 116 classifies WAP 102c as a rogue device. In this scenario, because client device 108b is connected to computing environment 100 via WAP 102c (e.g., classified as a rogue device), NMS 116 also may classify client device 108b as a rogue device. Additionally or alternatively, NMS 116 may classify client device 108b as a rogue device for reasons independent of whether or not client device 108b is connected to computing environment 100 via WAP 102c.

As another example, FIG. 1 illustrates interfering devices 120. In the illustrated example, interfering devices 120 include WAP 102e and client device 108c, which is connected to WAP 102e. Interfering devices 120 may be detectable by NMS 116 or another suitable component of computing environment 100 (e.g., a WAP 102, controller 104, or network switch 106).

Computer system 110 also may include rogue policy analysis engine 118. In certain embodiments, rogue policy analysis engine 118 is configured to evaluate the active rogue classification policies applied by NMS 116 and potentially recommend changes to the active rogue classification polices. Periodically, rogue policy analysis engine 118 may store a snapshot of active rogue classification policies and rogue classification information, and store the collected information as time series data.

The active rogue classification policies may include the current active rogue classification policies applied by NMS 116 to determine a classification for a detected device. The rogue classification information may include information associated with the network and/or electronic devices to which the active rogue classification policies have been applied by NMS 116. For example, the rogue classification information may include device attributes (e.g., physical device attributes and/or virtual device attributes), device classification information (e.g., identification of classifications assigned to detected devices), activity attributes (e.g., relating to the behavior of detected devices), identification of which one or more rogue classification policy lead to a particular classification for a device, network topology information, timestamp information, and/or any other suitable information.

Rogue policy analysis engine 118 may poll NMS 116 for the active rogue classification policies and/or the rogue classification information at regular or irregular time intervals. Additionally or alternatively, NMS 116 may automatically communicate the active rogue classification policies and/or the rogue classification information to rogue policy analysis engine 118 at regular or irregular time intervals.

Rogue policy analysis engine 118 may analyze the rogue classification information to determine whether to recommend changes to the active rogue classification policies. For example, rogue policy analysis engine 118 may use one or more machine learning algorithms to evaluate the active rogue classification policies. Because the collected information has been collected over time and stored as time series data, algorithms that facilitate trend analysis, anomaly analysis, and other types of time-based analysis may be used to evaluate the active rogue classification policies.

Based on the analysis of the active rogue classification policies, rogue policy analysis engine 118 may determine whether to generate one or more rogue classification policy recommendations. For example, based on the analysis, rogue policy analysis engine 118 may determine that one or more active rogue classification policies are not performing optimally, that certain detected devices are being misclassified, or that other deficiencies exist (or are predicted) for using active rogue classification policies to classify devices detected within the communication network implemented by computing environment 100.

If, based on the analysis, rogue policy analysis engine 118 determines that one or more recommendations should be made, rogue policy analysis engine 118 may generate one or more recommended rogue classification policies. A recommended rogue classification policy may include, for example, a new rogue classification policy or an update to an active rogue classification policy. In certain embodiments, one or more of the recommended rogue classification policies is a template rogue classification policy that includes one or more fields for configuration, such as by a network administrator (e.g., a user of administrator device 112).

In certain embodiments, rogue policy analysis engine 118, possibly in cooperation with NMS 116, automatically deploys one or more of the recommended rogue classification policies such that those recommended rogue classification policies automatically are made part of the active rogue classification policies for future evaluation of devices of computing environment 100. For example, rogue policy analysis engine 118 may automatically deploy one or more of the recommended rogue classification policy on one or more electronic devices to cause the electronic devices to automatically incorporate the recommended rogue classification policy as an active rogue classification policy. The electronic devices to which the recommended rogue classification policy are deployed could be one or more of NMS 116, WAPs 102, controller 104, network switch 106, or any other suitable electronic device.

In certain embodiments, rogue policy analysis engine 118, possibly in cooperation with NMS 116, submits one or more of the recommended rogue classification policies for review by a suitable individual, such as a network administrator (e.g., a user of administrator device 112). For example, rogue policy analysis engine 118 may transmit the recommended rogue classification policy to NMS 116 and/or an associated administrator device 112 (e.g., a network manager) for evaluation prior to deployment of the recommended rogue classification policy for incorporating the recommended rogue classification policy as an active rogue classification policy.

Rogue policy analysis engine 118 may repeat this process of evaluating the rogue classification policies applied by NMS 116 and potentially recommending changes to those rogue classification polices over time to continually improve the accuracy of the active rogue classification policies applied by NMS 116. Furthermore, embodiments of this disclosure apply complex machine learning algorithms that benefit from time series data and analysis performed over time to analyze rogue classifications policies and make associated recommendations reduce or eliminate dependence on individuals (e.g., a network administrator) to evaluate and adjust active rogue classification policies.

NMS 116 and rogue policy analysis engine 118 may be implemented using any suitable combination of hardware, firmware, and software. For example, NMS 116 and rogue policy analysis engine 118 may include any combination of hardware and programming to implement the described operations. The programming may be processor executable instructions stored on at least one non-transitory machine-readable storage medium and the hardware may include at least one processing resource to execute those instructions. In some examples, the hardware may also include other electronic circuitry to at least partially implement NMS 116 and rogue policy analysis engine 118. In some examples, the at least one machine-readable storage medium may store instructions that, when executed by one or more processors, at least partially implement NMS 116 and rogue policy analysis engine 118. In such examples, computer system 110 may include one or more computer-readable storage media storing the instructions and one or processors to execute the instructions.

Although illustrated separately, this disclosure contemplates NMS 116 and rogue policy analysis engine 118 being separate or combined. As just one example, rogue policy analysis engine 118 could be a part of NMS 116. Although shown to be implemented using computer system 110, NMS 116 and rogue policy engine 118 could be implemented on the same or different computer systems. Furthermore, this disclosure contemplates computing environment 100 (or another computing environment) including any suitable number of NMSs 116 and/or rogue policy analysis engines 118 implemented across any suitable number of computer systems. As just one example, a computing environment might include multiple NMSs 116 implemented on different computer systems, each associated with a corresponding rogue policy analysis engine 118 or all sharing a same rogue policy analysis engine 118.

Figure 2:
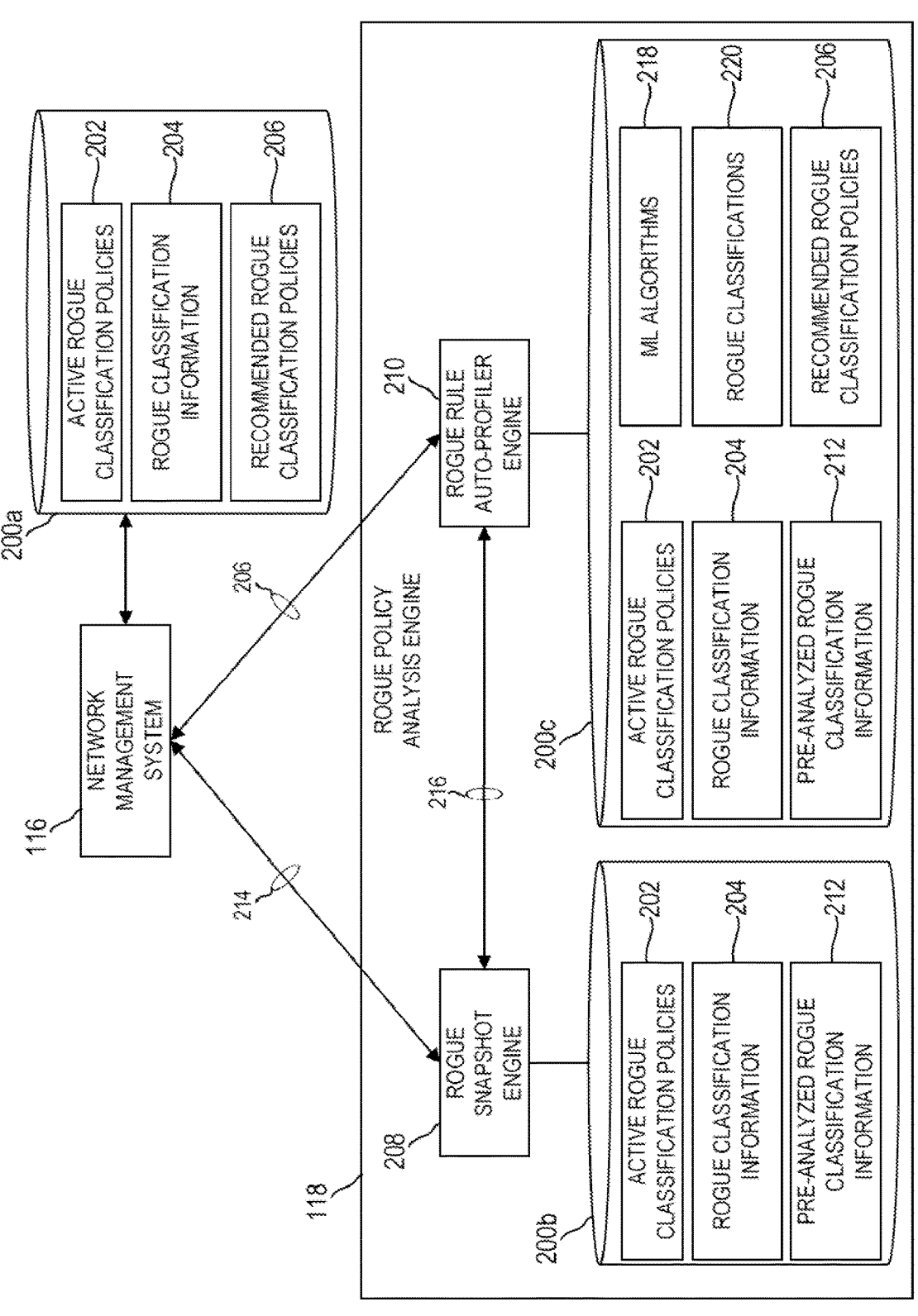
FIG. 2 illustrates additional details of a network management system (NMS) and rogue policy analysis engine for analyzing and recommending rogue classification policies in a communication network, according to certain embodiments.

FIG. 2 illustrates additional details of NMS 116 and rogue policy analysis engine 118 for analyzing and recommending rogue classification policies in a communication network, according to certain embodiments. Although illustrated as separate blocks, NMS 116 and rogue policy analysis engine 118 may be separate or combined. For example, rogue policy analysis engine 118 may be implemented as part of NMS 116, or may be implemented separately and communicate with the NMS 116.

NMS 116 may be coupled to or otherwise associated with storage device 200a, which may store information to be used by or generated by NMS 116. In certain embodiments, storage device 200a may be considered part of NMS 116. Storage device 200a may store active rogue detection policies 202, rogue classification information 204, and recommended rogue classification policies 206, each of which are described in greater detail below.

As described above, NMS 116 may detect devices within the communication network implemented by computing environment 100 and analyze detected devices at regular or irregular intervals according to one or more active rogue classification policies. These active rogue classification policies may be stored in storage device 200a as active rogue classification policies 202. Active rogue classification policies 202 may include a set of rules for classifying devices detected within the communication network into one or more of various rogue classifications. The rogue classifications define varying levels of a threat determined to be posed by an electronic device detected within the communication network implemented by computing environment 100. For example, active rogue classification policies 202 may include a set of rules that NMS 116 evaluates when determining the rogue classification to assign to a detected device. As just one example, the rogue classifications may be those described above with reference to Table 1.

Active rogue classification polices 202 may be initially installed and set up by an appropriate user (e.g., a network administrator via administrator device 112), with configurations thought to be appropriate for managing the communication network of computing environment 100. Over time, active rogue classification policies 202 may be modified, such as by reconfiguring certain active rogue classification policies 202, adding new rogue classification policies to active rogue classification policies 202, and/or deleting certain active rogue classification policies 202. These changes to active rogue classification policies 202 may be due, at least in part, to operation of rogue policy analysis engine 118.

Rogue classification information 204 may include various information associated with the communication network implemented by computing environment 100 and with electronic devices that are connected to or otherwise detected in association with the communication network. In certain embodiments, rogue classification information 204 may include one or more of device attributes (e.g., physical device attributes and/or virtual device attributes), device classification information (e.g., identification of classifications assigned to detected devices), activity attributes (e.g., relating to the behavior of detected devices), identification of which one or more rogue classification policies lead to a particular classification for a device, network topology information, timestamp information, and/or any other suitable information. Although rogue classification information 204 is described as including particular attributes or other information, rogue classification information 204 may include any suitable attributes or other information.

Device attributes may include physical device attributes and/or virtual device attributes of devices that are connected to or otherwise detected in association with the communication network implemented by computing environment 100. For example, for each detected device, the physical device attributes may include one or more of an IP address of the device, a MAC address of the device, an SSID of the device, a BSSID of the device, a vendor of the device, device type, the communication protocol used by the device, the RF configurations of the device, the role-based access control (RBAC) for the device (to the extent applicable), the operating system of the device, or any other suitable attribute. As another example, for each detected device, the virtual device attributes may include one or more of virtual local area network (VLAN) tagging for the device, port mapping for the device, virtual network topology for the device, security attributes (e.g., certificate(s), ciphers etc.), or any other suitable attribute.

The activity attributes may include a time, a point of entry, detecting network device count, detected client count on the communication network (e.g., the LAN), encryption cypher, encryption authentication, network type (e.g., WLAN), signal strength, channel, or the like. The point of entry, for example, may include the device of computing environment 100 to which the detected device connects or attempts to connect (e.g., detected on WLAN). In the case of the detected device being a rogue device or suspected rogue device, the point of entry may be referred to as an attack vector. The detecting network device count may include the number of electronic devices that have detected the detected device at issue. For example, in the case of a client device 108, the detecting network device count may include the number of WAPs 102 that have detected the client device 108.

Network topology information may include information about the communication network implemented as part of computing environment 100. For example, the network topology information may include, for each detected device and to the extent applicable, identification of one or more neighboring devices. Collecting this information for devices detected within the network of computing environment 100 may build for NMS 116 a topology of the communication network.

The timestamp information may include an identification of a time or time period at which rogue classification information 204 is obtained.

Although active rogue classification policies 202 and rogue classification information 204 are illustrated and described, this disclosure contemplates NMS 116 storing historical rogue classification policies and historical rogue classification information, if appropriate. For example, rather than simply storing the most recent active rogue classification policies 202 and rogue classification information 204, NMS 116 also may store historical active rogue classification policies and rogue classification information.

Recommended rogue classification policies 206, which are described in greater detail below with reference to rogue rule auto-profiler engine 210, may include recommendations received from rogue policy analysis engine 118 to update or otherwise modify active rogue classification policies 202.

Turning to rogue policy analysis engine 118, in certain embodiments rogue policy analysis engine 118 includes a rogue snapshot engine 208 and a rogue rule auto-profiler engine 210 to implement some or all of the operations of rogue policy analysis engine 118. Although illustrated separately, this disclosure contemplates rogue snapshot engine 208 and rogue rule auto-profiler engine 210 being separate or combined. As just one example, rogue snapshot engine 208 and rogue rule auto-profiler engine 210 could be implemented on the same or different computer systems.

In general, rogue snapshot engine 208 periodically obtains active rogue classification policies 202 and rogue classification information 204 and stores that information in storage device 200b as time series data. In certain embodiments, rogue snapshot engine 208 performs some initial analysis of the information collected by rogue snapshot engine 208.

Rogue snapshot engine 208 may be coupled to or otherwise associated with storage device 200b, which may store information to be used by or generated by rogue snapshot engine 208. Storage device 200b may store active rogue detection policies 202, rogue classification information 204, and pre-analyzed rogue classification information 212, each of which are described in greater detail below.

Rogue snapshot engine 208 may periodically obtain and store a snapshot of certain rogue information from NMS 116, which may be provided to rogue snapshot engine 208 as rogue information 214. Rogue snapshot engine 208 may periodically poll NMS 116 for rogue information 214. For example, rogue snapshot engine 208 may periodically poll NMS 116 (and/or any other suitable electronic devices) for attributes that are defined by a configuration schema of rogue snapshot engine 208. This configuration schema may identify the attributes for which rogue snapshot engine 208 may attempt to obtain attribute values. In part, the configuration schema may identify some or all of the attributes or other information included in rogue classification information 204, and rogue information 214 may include current values for those attributes or other information. Additionally or alternatively, NMS 116 may be configured to periodically on its own provide rogue information 214 to rogue snapshot engine 208.

Rogue information 214 may include active rogue classification policies 202 and rogue classification information 204. For example, rogue information 214 may include some or all of active rogue classification policies 202 and some or all of rogue classification information 204. Rogue snapshot engine 208 may store the active rogue classification policies 202 and rogue classification information 204 in a manner that timestamps the information. As just one example, rogue snapshot engine 208 may store the active rogue classification policies 202 and rogue classification information 204 as time series data in storage device 200*b*. This disclosure contemplates rogue snapshot engine 208 storing active rogue classification policies 202 and rogue classification information 204 in any suitable format.

In certain embodiments, obtaining rogue classification information 204 over time (e.g., as time series data) may provide rogue snapshot engine 208 (and later rogue rule auto-profiler engine 210) with a better understanding of the behavior of the detected electronic devices. For example, while values for attributes of a detected electronic device may provide a view of the electronic device at a particular instance, values for the attributes over time may provide a view to how the electronic devices are behaving, including, for example, how those electronic devices are moving throughout the communication network or are changing in ways that might be unexpected and/or indicative of a potential threat.

As described above, active rogue classification policies 202 may include a set of rules that NMS 116 evaluates when determining the rogue classification to assign to a detected device. Additionally, as described above, rogue classification information 204 may include various information associated with the communication network implemented by computing environment 100 and with electronic devices that are connected to or otherwise detected in association with the communication network. In certain embodiments, rogue classification information 204 may include one or more of device attributes, device classification information (e.g., identification of classifications assigned to detected devices), activity attributes (e.g., relating to the behavior of detected devices), identification of which one or more rogue classification policy lead to a particular classification for a device, network topology information, timestamp information, and/or any other suitable information.

Thus, periodically, rogue snapshot engine 208 may store the respective current rogue classifications of devices detected by NMS 116 in computing environment 100, along with the active rogue classification policies 202 that were used to analyze and determine a rogue classification for those detected devices. Because active rogue classification policies 202 applied by NMS 116 may change over time, rogue snapshot engine 208 may obtain new active rogue classification policies 202 periodically, potentially each time rogue snapshot engine 208 obtains new rogue classification information 204 and/or any time active rogue classification policies 202 are updated at NMS 116. Obtaining current active rogue classification policies 202 may help ensure that the analysis performed by rogue snapshot engine 208 (e.g., the pre-analysis described below) and the analysis performed by rogue rule auto-profiler engine 210 evaluates the most recent version of active rogue classification policies 202 that were used to determine rogue classifications that are part of the rogue classification information 204 that is being analyzed.

In certain embodiments, rogue snapshot engine 208 may execute a pre-analysis of rogue classification information 204 to attempt to identify anomalies in the attribute values and to validate the rogue classifications, as determined by NMS 116 according to active rogue classification policies 202, for the electronic devices detected within the communication network of computing environment 100. For example, prior to communicating rogue information 216 to rogue rule auto-profiler engine 210, rogue snapshot engine 208 may pre-analyze active rogue classification policies 202 and/or rogue classification information 204 to generate pre-analyzed rogue classification information 212. Rogue snapshot engine 208 may perform this pre-analysis in response to receiving rogue information 214 and/or at any other suitable interval.

In certain embodiments, the pre-analysis performed by rogue snapshot engine 208 includes attempting to identify anomalies in the rogue classification information 204. For example, the pre-analysis performed by rogue snapshot engine 208 includes attempting to identify anomalies in the attribute values of rogue classification information 204 and to validate the respective rogue classifications, as determined by NMS 116 according to active rogue classification policies 202, for the devices detected within the communication network of computing environment 100.

In certain embodiments, to perform the pre-analysis, rogue snapshot engine 208 uses one or more statistical anomaly algorithms, such as Z-score algorithm, K-nearest neighbors algorithm, support vector machines, density-based clustering techniques. These or other algorithms may be used in any suitable combination.

The Z-score algorithm generally refers to a statistical technique that measures how far a particular data point (e.g., a value for an attribute) is from the remainder of a dataset. For example, the Z-score may measure how many standard deviations the particular data point is from the mean for the dataset.

The K-nearest neighbors algorithm is a machine learning classification algorithm that assists with categorizing something based on similarities to other nearby data points. In other words, the K-nearest neighbors algorithm uses proximity of a data point to other data points to classify the data point. The K-nearest neighbors algorithm also can be used for regression analysis.

Support vector machines are supervised learning models with associated learning algorithms that analyze data for classification and/or prediction. As with the K-nearest neighbors algorithm, support vector machines also can be used for regression analysis.

Density-based clustering techniques are unsupervised machine learning techniques that identify distinctive clusters in a dataset according to the notion that related data points will be dense and separated from other related datapoints of other clusters by sparse data regions.

Using one or more of these or other statistical anomaly algorithms, rogue snapshot engine 208 may identify deviations in rogue classification information 204 (e.g., in the values for attributes or other information of rogue classification information 204) in a time lapse for its values, offer multiple predictability values for a particular attribute from the range of acceptable values.

Considering a particular attribute "A," over time, rogue snapshot engine 208 may have stored time series data of attribute values for attribute A corresponding to a particular electronic device. Rogue snapshot engine 208 may apply one or more statistical machine learning algorithms to a time window (which may be all or less than all of the time series data of attribute values for attribute A corresponding to the particular device) of attribute values for attribute corresponding to the particular device. This analysis of multiple attribute values, over time, for attribute A corresponding to the particular device may provide one or more predictability values for attribute A and may help identify anomalies and/or identify multiple predictability values for attribute A. The multiple predictability for attribute A may be the same as or different than the actual attribute values for attribute A for the particular device as stored in the time series data of storage device 200b.

These multiple predictability values (or other values generated according to the statistical machine learning algorithms used by rogue snapshot engine 208 to analyze rogue classification information 204) may be stored by rogue snapshot engine 208 as part of pre-analyzed rogue classification information 212. That is, in certain embodiments, rogue snapshot engine 208 may store the actual values (e.g., as included in rogue classification information 204) and the outcomes of the statistical anomaly algorithms (e.g., multiple predictability values) in an array or other suitable storage format that can provide a set of sample outputs for device attributes. This information may form pre-analyzed rogue classification information 212.

Furthermore, based on the outcomes of analyzing the rogue classification information 204 for an electronic device, rogue snapshot engine 208 may determine a threat rating for the electronic device. The threat ratings may be considered respective risk-based scores for the detected devices. The respective threat ratings may reflect a relative ranking of electronic devices according to the potential threat posed by the electronic devices. The respective threat ratings may be separate from the respective rogue classifications for the electronic devices. In certain embodiments, using different statistical machine learning algorithms, rogue snapshot engine 208 may determine multiple one or more threat ratings for a given electronic device, which may be the same or may differ from one another. These one or more threat ratings may be included in pre-analyzed rogue classification information 212.

This process of pre-analyzing rogue classification information 204 and generating one or more predictability values and/or one or more threat ratings may be repeated for each electronic device.

As a particular example application, a statistical anomaly analysis of current (and historical) rogue classification information 204 may reveal that the certificate attribute for a particular device (e.g., for a particular client device 108) has been modified frequently over a time interval. Based on this analysis, rogue snapshot engine 208 may mark the threat rating for this particular device to be the highest threat rating, even if that threat rating suggest a different rogue classification from the rogue classification assigned to the particular device by NMS 116 (as reflected in rogue classification information 204). Again, this threat rating assigned by rogue snapshot engine 208 may be stored as part of pre-analyzed rogue classification information 212. As other particular examples, frequently changing values for given attributes (e.g., topology/positioning associated with the device, SSID, etc.) of a particular device (or set of devices) may result in a heightened predicted threat level, as determined by rogue snapshot engine 208 according to the applied statistical anomaly algorithms.

Rogue snapshot engine 208 may store pre-analyzed rogue classification information 212 as time series data or in another suitable format.

In certain embodiments, rogue snapshot engine 208 is configured to communicate rogue information 216 to rogue rule auto-profiler engine 210 for further analysis. Rogue information 216 may include active rogue classification policies 202 and/or rogue classification information 204. In embodiments in which rogue snapshot engine 208 pre-analyzes rogue classification information 204, rogue information 216 may include pre-analyzed rogue classification information 212. In certain embodiments, rogue snapshot engine 208 provides pre-analyzed rogue classification information 212 to rogue rule auto-profiler engine 210 in a specific template understandable to rogue rule auto-profiler engine 210 post computation and in understandable schema (e.g., a time series database) that can be consumed by which can be consumed only by rogue rule auto-profiler engine 210.

Turning to rogue rule auto-profiler engine 210, in general, rogue rule auto-profiler engine 210 is configured to periodically perform additional analysis of rogue classification information 204 and/or pre-analyzed rogue classification information 212 in view of active rogue classification policies 202, and, depending on the outcome of any given instance of that analysis, potentially recommend one or more changes to active rogue classification policies 202.

Rogue rule auto-profiler engine 210 may be coupled to or otherwise associated with storage device 200c, which may store information to be used by or generated by rogue rule auto-profiler engine 210. Storage device 200c may store active rogue detection policies 202, rogue classification information 204, pre-analyzed rogue classification information 212, machine learning algorithms 218, rogue classifications 220, and recommended rogue classification policies, each of which are described in greater detail below.

Rogue rule auto-profiler engine 210 may periodically obtain rogue information 216 from rogue snapshot engine 208 rogue information 216. Rogue rule auto-profiler engine 210 may periodically poll rogue snapshot engine 208 for rogue information 216. Additionally or alternatively, rogue snapshot engine 208 may be configured to periodically on its own provide rogue information 216 to rogue rule auto-profiler engine 210. In certain embodiments, rogue rule auto-profiler engine 210 may obtain active rogue classification policies 202 from NMS 116.

Rogue information 216 may include active rogue classification policies 202, rogue classification information 204, and/or pre-analyzed rogue classification information 212. For example, rogue information 216 may include some or all of active rogue classification policies 202, some or all of rogue classification information 204, and some or all of pre-analyzed rogue classification information 212. In certain embodiments, rogue classification information 204 and pre-analyzed rogue classification information 212 may be combined in a suitable manner.

Rogue rule auto-profiler engine 210 may store rogue information 216 in storage device 200c in a manner that timestamps the information. As just one example, rogue rule auto-profiler engine 210 may store active rogue classification policies 202, rogue classification information 204, and/or pre-analyzed rogue classification information 212 as time series data in storage device 200c. This disclosure contemplates rogue rule auto-profiler engine 210 storing active rogue classification policies 202, rogue classification information 204, and/or pre-analyzed rogue classification information 212 in any suitable format.

Rogue rule auto-profiler engine 210 is configured to periodically analyze rogue classification information 204 and/or pre-analyzed rogue classification information 212 in view of active rogue classification policies 202, and, depending on the outcome of any given instance of that analysis, potentially recommend one or more changes to active rogue classification policies 202.

In certain embodiments, rogue rule auto-profiler engine 210 is configured to analyze rogue classification information 204 and/or pre-analyzed rogue classification information 212 using one or more statistical machine learning algorithms 218, examples of which are described below. Rogue rule auto-profiler engine 210 may use any of a variety of machine learning or other artificial intelligence algorithms to analyze active rogue classification policies 202 and rogue classification information 204 (and/or pre-analyzed rogue classification information 212, if appropriate). The one or more statistical machine learning algorithms 218 may be used in combination to analyze rogue classification information 204 and/or pre-analyzed rogue classification information 212.

For example, rogue rule auto-profiler engine 210 may analyze rogue classification information 204 and/or pre-analyzed rogue classification information 212 using a data correlation methodology, such as by applying a data correlation algorithm to the corresponding attribute values for the electronic devices.

As another example, rogue rule auto-profiler engine 210 may analyze rogue classification information 204 and/or pre-analyzed rogue classification information 212 using a data probability methodology, such as by applying a data probability algorithm to the corresponding attribute values for the electronic devices.

In certain embodiments, the one or more statistical machine learning algorithms include one or more of a Z-score algorithm, K-nearest neighbors algorithm, support vector machines, density-based clustering techniques. These or other algorithms may be used in any suitable combination.

In certain embodiments, analyzing rogue classification information 204 and/or pre-analyzed rogue classification information 212 includes assigning a respective threat rating to the electronic devices. The respective threat ratings may be considered respective risk-based scores for the detected devices. The respective threat ratings may reflect a relative ranking of electronic devices according to the potential threat posed by the electronic devices. The respective threat ratings may be separate from the respective rogue classifications for the electronic devices. In certain embodiments, the respective threat ratings are determined according to at least a portion of rogue classification information 204 and/or pre-analyzed rogue classification information 212. For example, the threat rating for a particular electronic device may be determined according to at least a portion of the corresponding attribute values for the electronic device. As another example, to the extent rogue snapshot engine 208 generates pre-analyzed rogue classification information 212 and that rogue classification information includes one or more threat ratings determined for one or more attributes for a particular electronic device (or group of electronic devices), the threat rating determined by rogue rule auto-profiler engine 210 may further consider the threat rating(s) determined by rogue snapshot engine 208.

The threat rating may be based on any suitable number of factors in any suitable combination. As a particular example of one potential factor in determining the threat rating, an electronic device that attempts to connect to the communication network with a greater frequency than another electronic device may be considered a higher threat risk. As a particular example of another potential factor in determining the threat rating, an electronic device having a point of entry (e.g., an attack vector) that is higher in the network may be considered a greater threat than an electronic device having a point of entry lower in the network. That is, in certain embodiments, network switch 106 may be considered a greater threat than controller 104, controller 104 may be considered a greater threat than a WAP 102, and a WAP 102 may be considered a greater threat than a client device 108.

In certain embodiments, for a particular device (or group of devices), rogue rule auto-profiler engine 210 may use one or more data probability methodologies to determine a threat rating to assign to a given attribute. The probability methodology may include time lapsed attribute values for an attribute and the one or more threat ratings for the attribute as determined by rogue snapshot engine 208. Based on this analysis using the data probability methodologies, rogue rule auto-profiler engine 210 may determine a particular threat rating to assign to the attribute for the particular device (or group of devices).

Rogue rule auto-profiler engine 210 may determine respective threat ratings for electronic devices prior to performing at least a portion of the analysis of the rogue classification information 204 and/or pre-analyzed rogue classification information 212 using one or more statistical machine learning algorithms 218, and the determined threat rating may be part of the statistical analysis. For example, one or more data correlation methodologies may then be applied, considering the determined threat ratings, device types, position in the network, neighboring devices (and/or other topology characteristics), and any other suitable information. For example, rogue rule auto-profiler engine 210 then may perform a threat risk analysis using a data correlation algorithm. In certain embodiments, the threat risk analysis may be based on rogue information 216, such as the type of the particular device (e.g., client device, WAP, controller, network switch, etc.), the position of the particular device in the communication network (e.g., attack vector), neighboring devices to the particular device, and/or any other suitable information. This threat risk analysis may help determine an overall threat rating for the particular device.

Rogue rule auto-profiler engine 210 may repeat this process for one or more of the devices (or groups of devices) for which information is included in rogue information 216 to determine the respective threat ratings for electronic devices.

Based on the analysis of rogue classification information 204 and/or pre-analyzed rogue classification information 212, rogue rule auto-profiler engine 210 may determine respective rogue classifications 220 for detected devices. For a given device, the rogue classification 220 for that device might or might not differ from the rogue classification determined by NMS 116 and/or any rogue classifications determined as part of the pre-analysis performed by rogue snapshot engine 208. Respective rogue classifications 220 may benefit from the use of machine learning algorithms 218 and the time-lapse data of rogue classification information 204 and/or pre-analyzed rogue classification information 212.

The analysis of rogue classification information 204 and/or pre-analyzed rogue classification information 212 may result in an evaluation of active rogue classification policies 202. The evaluation may include a determination of whether to provide one or more recommended rogue classification policies 206 to update active rogue classification policies 202. For example, based on the analysis, rogue rule auto-profiler engine 210 may determine that one or more active rogue classification policies 202 are not performing optimally, that certain detected devices are not being assigned an optimal rogue classification, or that other deficiencies exist (or are predicted) for using active rogue classification policies 202 to classify detected devices.

In certain embodiments, the analysis of rogue classification information 204 and/or pre-analyzed rogue classification information 212 may include performing the statistical analysis of the corresponding attributes values for the attributes of the detected electronic devices separately, and comparing the results of the analysis with active rogue classification policies 202. For example, the statistical analysis of the corresponding attributes values for the attributes of the detected electronic devices may identify existing and/or predicted anomalies in the classification results produced according to an active rogue classification policy 202. The anomaly could be an anomaly in an attribute definition, an attribute value, and/or any other suitable aspect of an active rogue classification policy 202 and/or rogue classification information 204 and/or pre-analyzed rogue classification information 212. If the analysis performed by rogue rule auto-profiler engine 210 detects such anomalies, rogue rule auto-profiler engine 210 may determine to recommend one or more recommended rogue classification policies 206. If appropriate, one or more thresholds may be defined to control when a detected statistical anomaly is sufficiently significant to cause rogue rule auto-profiler engine 210 to determine to recommend one or more recommended rogue classification policies 206.

If, based on the analysis, rogue rule auto-profiler engine 210 determines that one or more recommendations should be made, rogue rule auto-profiler engine 210 may generate one or more recommended rogue classification policies 206. A recommended rogue classification policy 206 may include, for example, a new rogue classification policy or an update to an active rogue classification policy 202. In certain embodiments, one or more of the recommended rogue classification policies 206 is a template rogue classification policy that includes one or more fields for configuration, such as by a network administrator (e.g., a user of administrator device 112).

For example, rogue rule auto-profiler engine 210 already stores active rogue classification policies 202 (e.g., in storage device 200c), which may include a policy template and associated values for one or more attributes. If appropriate, a new policy template with associated suggested values may be mapped and used as one of recommended rogue classification policies 206.

In certain embodiments, the attributes that could be used for recommended rogue classification policies 206 are selectable attributes that are known to rogue rule auto-profiler engine 210 (as well as NMS 116 and rogue snapshot engine 208) through active rogue classification policies 202. A recommended rogue classification policy 206 that is an updated and ready-to-deploy active rogue classification policy 202 may or may not be activated. In certain embodiments, if an attribute is already configured as part of active rogue classification policies 202, then for modifying a particular active rogue classification policy 202, recommended rogue classification policies 206 may include a recommendation for new values for that attribute for the particular active rogue classification policy 202. In certain embodiments, if an attribute is not already configured as part of active rogue classification policies 202, then recommended rogue classification policies 206 may include a recommendation for a newly-defined attribute with associated value assignment to add to active rogue classification policies 202. The values defined by recommended rogue classification policies 206 can be specific values or can be ranges of values.

In certain embodiments, rogue rule auto-profiler engine 210, possibly in cooperation with NMS 116, automatically deploys one or more of the recommended rogue classification policies 206 such that those recommended rogue classification policies 206 automatically are made part of the active rogue classification policies 202 for future evaluation of devices of computing environment 100. For example, rogue rule auto-profiler engine 210 may automatically deploy one or more of the recommended rogue classification policies 206 on one or more electronic devices to cause the electronic devices to automatically incorporate the recommended rogue classification policy 206 as an active rogue classification policy 202. The electronic devices to which the recommended rogue classification policy 206 is deployed could be one or more of NMS 116, WAPs 102, controller 104, network switch 106, or any other suitable electronic device.

In certain embodiments, rogue rule auto-profiler engine 210, possibly in cooperation with NMS 116, submits one or more of the recommended rogue classification policies 206 for review by a suitable individual, such as a network administrator (e.g., a user of administrator device 112). For example, rogue rule auto-profiler engine 210 may transmit the recommended rogue classification policy 206 to NMS 116 and/or an associated administrator device 112 (e.g., a network manager) for evaluation prior to deployment of the recommended rogue classification policy 206 for incorporating the recommended rogue classification policy 206 as an active rogue classification policy 202.

Rogue rule auto-profiler engine 210 may repeat this process of evaluating the active rogue classification policies 202 applied by NMS 116 and potentially recommending changes to those active rogue classification polices 202 over time to continually improve the accuracy of the active rogue classification policies 202 applied by NMS 116. Furthermore, embodiments of this disclosure apply complex machine learning algorithms that benefit from historical data and analysis performed over time to analyze active rogue classification policies 202 and make associated recommendations reduce or eliminate dependence on individuals (e.g., a network administrator) to evaluate and adjust active rogue classification policies 202.

Although described primarily with respect to individual electronic devices (e.g., WAPs 102, controllers 104, network switches 106, and client devices 108), NMS 116 and/or rogue policy analysis engine 118, including rogue snapshot engine 208 and/or rogue rule auto-profiler engine 210, may evaluate electronic devices individually or as one or more groups of electronic devices.

Storage devices 200a, 200b, and 200c (referred to collectively as storage devices 200) may each take the form of volatile or non-volatile memory including, without limitation, magnetic media, optical media, RAM, ROM, removable media, or any other suitable memory component. In certain embodiments, a portion of all of storage devices 200 may include a database, such as one or more structured query language (SQL) servers, times-series databases, and/or relational databases. Additionally or alternatively, in certain embodiments, a portion or all of storage devices 200 may include non-relational storage. Although storage devices 200a, 200b, and 200c are illustrated separately, one or more of storage devices 200a, 200b, and 200c may be combined or further separated in any suitable manner.

Figure 3:
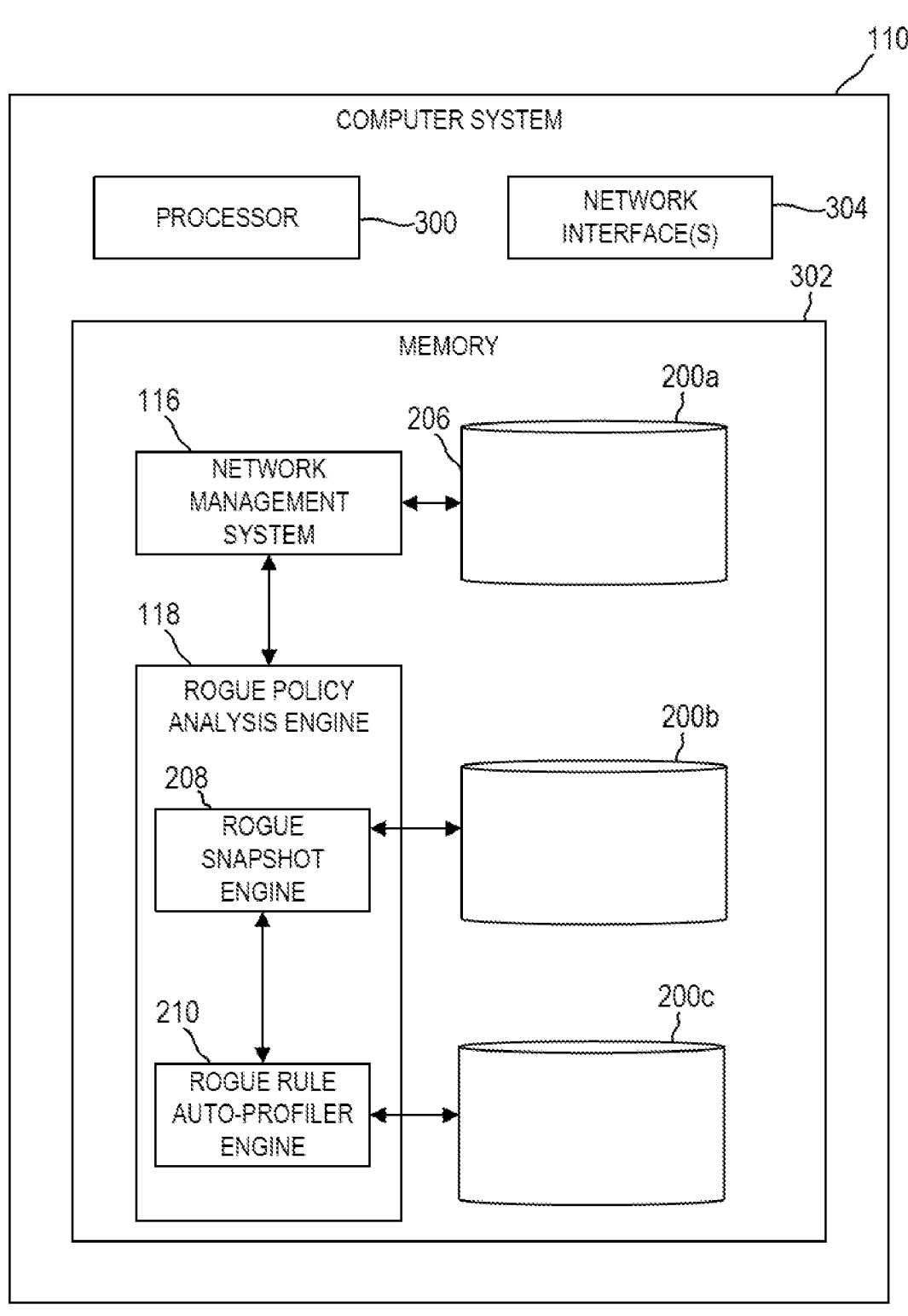
FIG. 3 illustrates additional details of example computer system that includes an NMS and rogue policy analysis engine for analyzing and recommending rogue classification policies in a communication network, according to certain embodiments.

FIG. 3 illustrates additional details of example computer system 110 that includes NMS 116 and rogue policy analysis engine 118 for analyzing and recommending rogue classification policies in a communication network, according to certain embodiments. Although a particular implementation of computer system 110 is illustrated and described, this disclosure contemplates any suitable implementation of computer system 100.

Computer system 110 may be implemented using any suitable combination of hardware, firmware, and software. Computer system 110 includes processor 300, memory 302 and, network interface 304. Although described in the singular for ease of description, computer system 110 may include one or more processors 300, one or more memories 302, and one or more network interfaces 304.

Processor 300 may include one or more microprocessors, controllers, or any other suitable computing devices or resources. Processor 300 may work, either alone or with other components of computing environment 100 (see FIG. 1), to provide a portion or all of the functionality of its associated computer system 110 described herein.

Memory 302 may take the form of volatile or non-volatile memory including, without limitation, magnetic media, optical media, RAM, ROM, removable media, or any other suitable memory component.

Memory 302 stores NMS 116 and rogue policy analysis engine 118. In examples in which rogue policy analysis engine 118 is implemented using rogue snapshot engine 208 and rogue rule auto-profiler engine 210, memory 302 may store rogue snapshot engine 208 and rogue rule auto-profiler engine 210.

Memory 302 may include storage devices 200. For the sake of not overcrowding FIG. 3, the contents of storage devices 200 are not shown. Although storage devices 200 are shown to be a part of memory 302, storage devices 200 may be a part of or separate from memory 302. Furthermore, one or more of storage devices 200 may be separate and potentially remote from the one or more processing devices on which NMS 116, rogue snapshot engine 208, and/or rogue rule auto-profiler engine 210 operate.

Interface 304 represents any suitable computer element that can receive information from a communication network, transmit information through a communication network, perform suitable processing of the information, communicate to other components (e.g., of computing environment 100), or any combination of the preceding. Interface 304 represents any port or connection, real or virtual, including any suitable combination of hardware, firmware, and software, including protocol conversion and data processing capabilities, to communicate through a LAN, WAN, or other communication system that allows information to be exchanged with devices of computing environment 100. Interface 304 may facilitate wireless and/or wired communication.

FIGS. 4-6 illustrate example methods for analyzing rogue classification policies (e.g., active rogue classification policies 202) for a communication network, according to certain embodiments. Although the methods described with reference to FIGS. 4-6 may be applied to any suitable type of communication network that includes any suitable type of electronic devices, in certain embodiments, the communication network is a WLAN and the electronic devices include one or more of a client device (e.g., client device 108), a WAP (e.g., WAP 102), a WLAN controller (e.g., WLAN controller 104), or a network switch (e.g., network switch 106). Each of these figures is described below.

FIG. 4 illustrates an example method 400 for analyzing and recommending rogue classification policies for a communication network, according to certain embodiments. In certain embodiments, some or all of the operations associated with method 400 are performed by computer system 110, which also may be referred to as a processing device. For example, some or all of the operations associated with method 600 may be performed by rogue policy analysis engine 118. In certain embodiments, computer system 110 includes NMS 116.

At step 402, rogue policy analysis engine 118 obtains, at multiple times, rogue classification information 204 for electronic devices detected within a communication network (e.g., the communication network associated with computing environment 100). The rogue classification information 204 for each of the times may include timestamp information identifying the time; corresponding sets of attribute values (e.g., as part of rogue classification information 204) for the electronic devices detected within the communication network at the time; and respective rogue classifications (e.g., as part of rogue classification information 204), as determined according to active rogue classification policies 202 and the corresponding sets of attribute values, for the electronic devices detected within the communication network at the time.

As described above, in certain embodiments, active rogue classification policies 202 include rules for classifying the electronic devices detected within the communication network (e.g., associated with computing environment 100) into a rogue classification of multiple possible rogue classifications. The multiple possible rogue classifications define varying levels of a threat determined to be posed by an electronic device detected within the communication network.

In certain embodiments, the respective rogue classifications, as determined according to active rogue classification policies 202, for the electronic devices detected within the communication network may be determined according to the corresponding attribute values for the electronic devices detected within the communication network. The corresponding attribute values may be for attributes that include device attributes and activity attributes associated with the corresponding electronic device.

At step 404, rogue policy analysis engine 118 may analyze rogue classification information 204 for the multiple times to determine whether to modify active rogue classification policies 202. Analyzing rogue classification information 204 for the multiple times may include analyzing, using a statistical machine learning algorithm, the respective rogue classifications (e.g., of rogue classification information 204) and the corresponding sets of attribute values (e.g., of rogue classification information 204) for the electronic devices for the multiple times.

In certain embodiments, analyzing rogue classification information 204 using the statistical machine learning algorithm includes analyzing the corresponding attribute values (e.g., of rogue classification information 204) for the electronic devices using one or more data correlation algorithms. In certain embodiments, analyzing rogue classification information 204 using the statistical machine learning algorithm includes analyzing the corresponding attribute values (e.g., of rogue classification information 204) for the electronic devices using one or more data prediction algorithms.

In certain embodiments, prior to analyzing rogue classification information 204, rogue policy analysis engine 118 may execute a pre-analysis of rogue classification information 204 to attempt to identify anomalies in the corresponding attribute values (e.g., of rogue classification information 204) and to validate the respective rogue classifications (e.g., of rogue classification information 204), as determined according to active rogue classification policies 202, for the electronic devices detected within the communication network.

In certain embodiments, analyzing rogue classification information 204 includes assigning a threat rating to a particular electronic device. The threat rating may be separate from the respective rogue classification for the particular electronic device and may be determined according to at least a portion of the corresponding attribute values for the particular electronic device.

At step 406, rogue policy analysis engine 118 determines, according to the analysis of rogue classification information 204 for the multiple times, whether to modify active rogue classification policies 202.

If rogue policy analysis engine 118 determines at step 406 not to modify active rogue classification policies 202, then method 400 may proceed to step 412.

If rogue policy analysis engine 118 determines at step 406 to modify active rogue classification policies 202, then at step 408, rogue policy analysis engine 118 may generate, in response to determining to modify active rogue classification policies 202, one or more recommended rogue classification policies 206.

In certain embodiments, a recommended rogue classification policy 206 may be a new rogue classification policy or an update to an active rogue classification policy 202. In certain embodiments, a recommended rogue classification policy 206 could be a template rogue classification policy that includes one or more fields for configuration, and the recommended rogue classification policy 206 may include recommended values for the one or more fields. The one or more fields, for example, could correspond to one or more attributes.

At step 410, rogue policy analysis engine 118 transmits the one or more recommended rogue classification policies 206 generated at step 408 for consideration and/or deployment. For example, a recommended rogue classification policy 206 may be transmitted to a network manager (e.g., associated with administrator device 112) for evaluation prior to deployment of the recommended rogue classification policy 206 for incorporating the recommended rogue classification policy 206 as an active rogue classification policy of active rogue classification policies 202. As another example, a recommended rogue classification policy 206 may be automatically deployed on an electronic device (e.g., NMS 116) to cause the electronic device to automatically incorporate the recommended rogue classification policy 206 as an active rogue classification policy of the active rogue classification policies 202.

The one or more recommended rogue classification policies 206 generated at step 408 may all be transmitted in the same or various ways. For example, some or all of the one or more recommended rogue classification policies 206 may be transmitted to a network manager (e.g., associated with administrator device 112) for evaluation prior to deployment of the recommended rogue classification policy 206. As another example, some or all of the one or more recommended rogue classification policies 206 may be automatically deployed on an electronic device (e.g., NMS 116) to cause the electronic device to automatically incorporate the recommended rogue classification policy 206 as an active rogue classification policy of the active rogue classification policies 202.

FIG. 5 illustrates an example method 500 for analyzing rogue classification policies for a communication network, according to certain embodiments. In certain embodiments, some or all of the operations associated with method 500 are performed by computer system 110. For example, some or all of the operations associated with method 600 may be performed by rogue policy analysis engine 118, such as by rogue snapshot engine 208. For purposes of this example, this disclosure describes rogue snapshot engine 208 as perform the operations of method 500. As described below, method 500 may be an iterative process.

At step 502, rogue snapshot engine 208 obtains rogue information 214 from NMS 116. In certain embodiments, rogue snapshot engine 208 periodically requests rogue information 214 from NMS 116, and NMS 116 communicates rogue information 214 to rogue snapshot engine 208 in response to the request. Additionally or alternatively, in certain embodiments, NMS 116 may periodically, on its own, send rogue information 214 to rogue snapshot engine 208.

Rogue information 214 may include active rogue classification policies 202 and current rogue classification information 204. Although rogue information 214 is described as including active rogue classification policies 202, in certain embodiments, active rogue classification policies 202 may be omitted from rogue information 214. While active rogue classification policies 202 may be omitted from rogue information 214 for any suitable reason, in certain embodiments, aside from an initial communication of active rogue classification policies 202, NMS 116 communicates active rogue classification policies 202 to rogue snapshot engine 208 when there has been a change to active rogue classification policies 202, which may reduce the amount of data being communicated to rogue snapshot engine 208 with at least some transmissions of rogue information 214.

At step 504, rogue snapshot engine 208 stores rogue information 214 as time series data. For example, rogue snapshot engine 208 may store rogue information 214 as time series data in storage device 200b. As a particular example, rogue snapshot engine 208 may store current rogue classification information 204 as time series data in storage device 200b. As described above, rogue classification information 204 may include one or more of device attributes (e.g., physical device attributes and/or virtual device attributes), device classification information (e.g., identification of classifications assigned to detected devices), activity attributes (e.g., relating to the behavior of detected devices), identification of which one or more rogue classification policy lead to a particular classification for a device, network topology information, timestamp information, and/or any other suitable information. Although rogue classification information 204 is described as including particular attributes or other information, rogue classification information 204 may include any suitable attributes or other information. Thus, in certain embodiments, rogue snapshot engine 208 stores attribute values for a particular time as time series data in storage device 202b. Over time (e.g., with multiple passes through method 500), the rogue classification information 204 stored in storage device 202b may form snapshots of data (e.g., attribute values) taken at particular times.

Active rogue classification policies 202 might or might not be stored as part of the time series data. For example, rogue snapshot engine 208 may simply store a most recent copy of active rogue classification policies 202. Additionally or alternatively, rogue snapshot engine 208 may store time-stamped copies of two or more unique versions of active rogue classification policies 202 as obtained over time.

At step 506, rogue snapshot engine 208 executes a pre-analysis of rogue classification information 204 to generate pre-analyzed rogue classification information 212. Rogue snapshot engine 208 may execute the pre-analysis of rogue classification information 204 to attempt to identify anomalies in the attribute values and to validate the rogue classifications, as determined by NMS 116 according to active rogue classification policies 202, for the electronic devices detected within the communication network of computing environment 100. For example, prior to communicating rogue information 216 to rogue rule auto-profiler engine 210 (at step 508, described below), rogue snapshot engine 208 may pre-analyze active rogue classification policies 202 and rogue classification information 204 to generate pre-analyzed rogue classification information 212. Rogue snapshot engine 208 may perform this pre-analysis in response to receiving rogue information 214 and/or at any other suitable interval.

In certain embodiments, the pre-analysis performed by rogue snapshot engine 208 includes attempting to identify anomalies in the rogue classification information 204. For example, the pre-analysis performed by rogue snapshot engine 208 includes attempting to identify anomalies in the attribute values and to validate the respective rogue classifications, as determined by NMS 116 according to active rogue classification policies 202, for the devices detected within the communication network of computing environment 100.

In certain embodiments, to perform the pre-analysis, rogue snapshot engine 208 uses one or more statistical anomaly algorithms, such as Z-score algorithm, K-nearest neighbors algorithm, support vector machines, density-based clustering techniques. These or other algorithms may be used in any suitable combination.

Using one or more of these or other statistical anomaly algorithms, rogue snapshot engine 208 may identify deviations in rogue classification information 204 (e.g., in the values for attributes or other information of rogue classification information 204) in a time lapse for its values, offer multiple predictability values for a particular attribute from the range of acceptable values. In certain embodiments, rogue snapshot engine 208 may store the actual values (e.g., as included in rogue classification information 204) and the outcomes of the statistical anomaly algorithms (e.g., multiple predictability values) in an array or other suitable storage format that can provide a set of sample outputs for device attributes. This information may form pre-analyzed rogue classification information 212.

Rogue snapshot engine 208 may store pre-analyzed rogue classification information 212 as time series data or in another suitable format. Over time (e.g., with multiple passes through method 500), the pre-analyzed rogue classification information 212 stored in storage device 202b may form snapshots of analyzed data (e.g., analyzed attribute values) performed at particular times.

At step 508, rogue snapshot engine 208 transmits rogue information 216 to rogue rule auto-profiler engine 210 for further analysis. Rogue information 216 may include one or more of rogue classification information 204, pre-analyzed rogue classification information 212, or any other suitable information. For example, rogue snapshot engine 208 may transmit a current snapshot of rogue classification information 204 to rogue rule auto-profiler engine 210 for further analysis. Additionally or alternatively, rogue snapshot engine 208 may transmit the most current pre-analyzed rogue classification information 212 to rogue rule auto-profiler engine 210 for further analysis. Rogue snapshot engine 208 may have generated the most current pre-analyzed rogue classification information 212 based at least in part on the most recent rogue classification information 204. Thus, over time (e.g., over repeated executions of method 500), rogue snapshot engine 208 may be communicating the most recent snapshot of rogue classification information 204 and/or pre-analyzed rogue classification information 212 to rogue rule auto-profiler engine 210.

At step 510, rogue snapshot engine 208 determines whether a time interval has passed to determine whether to obtain additional rogue information 214 from NMS 116. In other words, rogue snapshot engine 208 determines whether it is time to obtain a next snapshot of rogue information 214 from NMS 116. As described above, rogue snapshot engine 208 may periodically obtain rogue information 214 from NMS 116. The time interval may define the frequency with which rogue snapshot engine 208 obtains rogue information 214 (e.g., snapshots of rogue information 214) from NMS 116. Furthermore, the time interval could be any suitable time. The time interval could be the same or vary with different passes through method 500.

If rogue snapshot engine 208 determines at step 510 that the time interval has not passed, then rogue snapshot engine 208 may continue to wait before obtaining additional rogue information 214 from NMS 116. If rogue snapshot engine 208 determines at step 510 that time interval has passed, then rogue snapshot engine 208 may return to step 502 to obtain additional rogue information 214 from NMS 166.

The determination at step 510 might or might not be an explicit determination made by rogue snapshot engine 208. Rogue snapshot engine 208 may determine or otherwise be triggered to obtain additional rogue information 214 in any suitable manner. As described above, additionally or alternatively, in certain embodiments, NMS 116 may periodically send additional rogue information 214 to rogue snapshot engine without rogue snapshot engine 208 requesting additional rogue information 214.

FIG. 6 illustrates an example method 600 for analyzing and
recommending rogue classification policies for a communication network, according to certain embodiments. In certain embodiments, some or all of the operations associated with method 600 are performed by computer system 110. For example, some or all of the operations associated with method 600 may be performed by rogue policy analysis engine 118, such as by rogue rule auto-profiler engine 210.

At step 602, rogue rule auto-profiler engine 210 obtains rogue information 216 from rogue snapshot engine 208, rogue rule auto-profiler engine 210 may periodically request rogue information 216 from rogue snapshot engine 208 and/or rogue snapshot engine 208 may, on its own, periodically communicate rogue information 216 to rogue rule auto-profiler engine 210. In certain embodiments, rogue rule auto-profiler engine 210 periodically requests rogue information 216 from rogue snapshot engine 208, and rogue snapshot engine 208 communicates rogue information 216 to rogue rule auto-profiler engine 210 in response to the request. Additionally or alternatively, in certain embodiments, rogue snapshot engine 208 may periodically, on its own, send rogue information 216 to rogue rule auto-profiler engine 210.

As described above, rogue information 216 may include one or more of rogue classification information 204, pre-analyzed rogue classification information 212, or any other suitable information. For example, rogue snapshot engine 208 may transmit a current snapshot of rogue classification information 204 to rogue rule auto-profiler engine 210 for further analysis. Additionally or alternatively, rogue snapshot engine 208 may transmit the most current pre-analyzed rogue classification information 212 to rogue rule auto-profiler engine 210 for further analysis. Rogue snapshot engine 208 may have generated the most current pre-analyzed rogue classification information 212 based at least in part on the most recent rogue classification information 204. Thus, over time (e.g., over repeated executions of method 500), rogue snapshot engine 208 may be communicating the most recent snapshot of rogue classification information 204 and/or pre-analyzed rogue classification information 212 to rogue rule auto-profiler engine 210.

Rogue information 216 may include timestamp information identifying the time; corresponding sets of attribute values (e.g., as part of rogue classification information 204 and/or pre-analyzed rogue classification information) for the electronic devices detected within the communication network at the time; and respective rogue classifications (e.g., as part of rogue classification information 204 and/or pre-analyzed rogue classification information), as determined according to active rogue classification policies 202 and the corresponding sets of attribute values, for the electronic devices detected within the communication network at the time. In certain embodiments, rogue information 216 includes active rogue classification policies 202.

At step 604, rogue rule auto-profiler engine 210 stores rogue information 216 as time series data. For example, rogue rule auto-profiler engine 210 may store rogue information 216 as time series data in storage device 200c. As a particular example, rogue rule auto-profiler engine 210 may store current rogue classification information 204 as time series data in storage device 200c. As described above, rogue classification information 204 may include one or more of device attributes (e.g., physical device attributes and/or virtual device attributes), device classification information (e.g., identification of classifications assigned to detected devices), activity attributes (e.g., relating to the behavior of detected devices), identification of which one or more rogue classification policy lead to a particular classification for a device, network topology information, timestamp information, and/or any other suitable information. Although rogue classification information 204 is described as including particular attributes or other information, rogue classification information 204 may include any suitable attributes or other information. Thus, in certain embodiments, rogue rule auto-profiler engine 210 stores attribute values for a particular time as time series data in storage device 202c. Over time (e.g., with multiple passes through method 600), the rogue classification information 204 stored in storage device 202c may form historical data (e.g., attribute values) that can be used as part of analyzing newly received rogue information 216 to evaluate active rogue classification policies 202.

Active rogue classification policies 202 might or might not be stored as part of the time series data. For example, rogue rule auto-profiler engine 210 may simply store a most recent copy of active rogue classification policies 202. Additionally or alternatively, rogue rule auto-profiler engine 210 may store timestamped copies of two or more unique versions of active rogue classification policies 202 as obtained over time.

At step 606, rogue rule auto-profiler engine 210 may analyze rogue classification information 204 for the multiple times to determine whether to modify active rogue classification policies 202. Analyzing rogue classification information 204 for the multiple times may include analyzing, using a statistical machine learning algorithm, the respective rogue classifications (e.g., of rogue classification information 204) and the corresponding sets of attribute values (e.g., of rogue classification information 204) for the electronic devices for the multiple times.

In certain embodiments, analyzing rogue classification information 204 using the statistical machine learning algorithm includes analyzing the corresponding attribute values (e.g., of rogue classification information 204) for the electronic devices using one or more data correlation algorithms. In certain embodiments, analyzing rogue classification information 204 using the statistical machine learning algorithm includes analyzing the corresponding attribute values (e.g., of rogue classification information 204) for the electronic devices using one or more data prediction algorithms.

In certain embodiments, analyzing rogue classification information 204 includes analyzing pre-analyzed rogue classification information 212.

In certain embodiments, analyzing rogue classification information 204 includes assigning a threat rating to a particular electronic device. The threat rating may be separate from the respective rogue classification for the particular electronic device and may be determined according to at least a portion of the corresponding attribute values for the particular electronic device.

At step 608, rogue rule auto-profiler engine 210 determines, according to the analysis of rogue classification information 204, whether to modify active rogue classification policies 202.

If rogue rule auto-profiler engine 210 determines at step 608 not to modify active rogue classification policies 202, then method 600 may proceed to step 614.

If rogue policy analysis engine 118 determines at step 608 to modify active rogue classification policies 202, then at step 610, rogue policy analysis engine 118 may generate, in response to determining to modify active rogue classification policies 202, one or more recommended rogue classification policies 206.

In certain embodiments, a recommended rogue classification policy 206 may be a new rogue classification policy or an update to an active rogue classification policy 202. In certain embodiments, a recommended rogue classification policy 206 could be a template rogue classification policy that includes one or more fields for configuration, and the recommended rogue classification policy 206 may include recommended values for the one or more fields. The one or more fields, for example, could correspond to one or more attributes.

At step 612, rogue policy analysis engine 118 transmits the one or more recommended rogue classification policies 206 generated at step 610 for consideration and/or deployment. For example, a recommended rogue classification policy 206 may be transmitted to a network manager (e.g., associated with administrator device 112) for evaluation prior to deployment of the recommended rogue classification policy 206 for incorporating the recommended rogue classification policy 206 as an active rogue classification policy of active rogue classification policies 202. As another example, a recommended rogue classification policy 206 may be automatically deployed on an electronic device (e.g., NMS 116) to cause the electronic device to automatically incorporate the recommended rogue classification policy 206 as an active rogue classification policy of the active rogue classification policies 202.

The one or more recommended rogue classification policies 206 generated at step 610 may all be transmitted in the same or various ways. For example, some or all of the one or more recommended rogue classification policies 206 may be transmitted to a network manager (e.g., associated with administrator device 112) for evaluation prior to deployment of the recommended rogue classification policy 206. As another example, some or all of the one or more recommended rogue classification policies 206 may be automatically deployed on an electronic device (e.g., NMS 116) to cause the electronic device to automatically incorporate the recommended rogue classification policy 206 as an active rogue classification policy of the active rogue classification policies 202.

Figure 7:
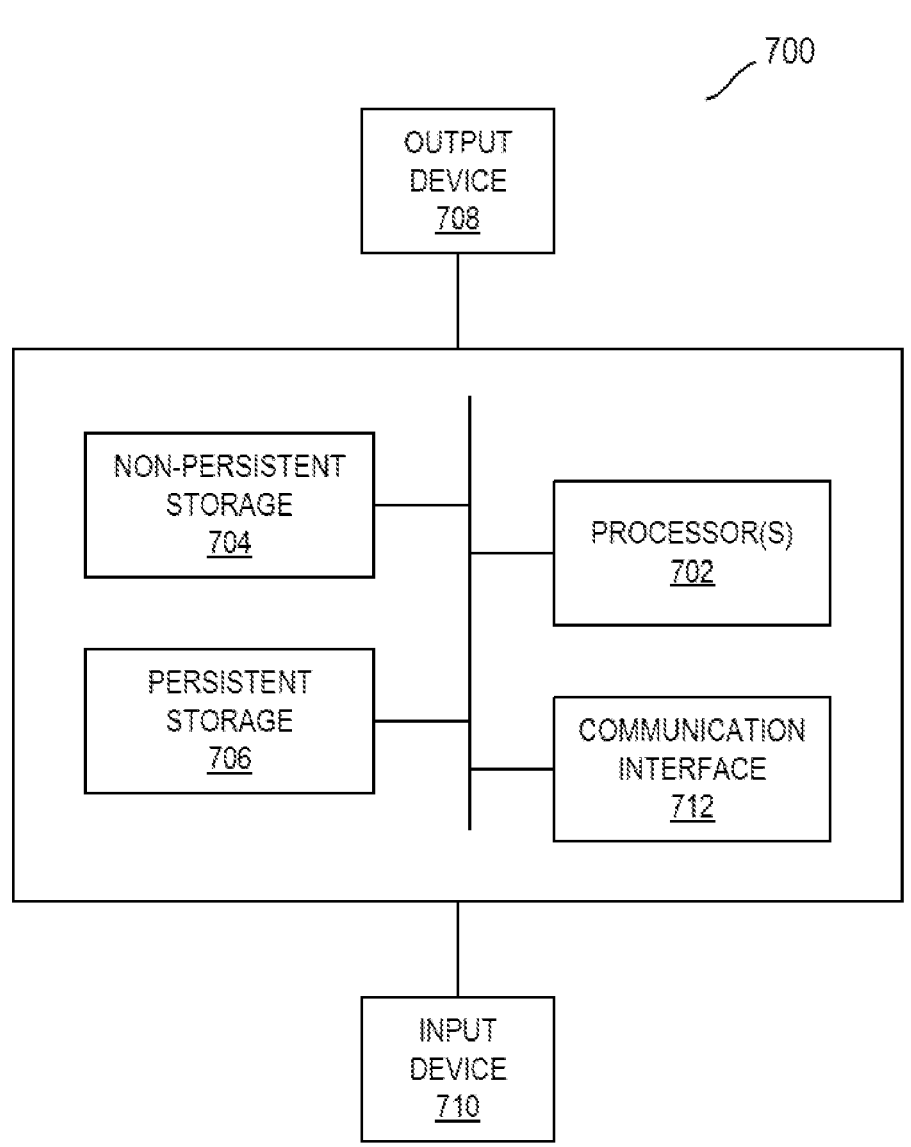
FIG. 7 illustrates a block diagram of an example computing device, according to certain embodiments

FIG. 7 illustrates a block diagram of an example computing device 700, according to certain embodiments. As discussed above, embodiments described herein may be implemented using computing devices. For example, all or any portion of the components shown in FIGS. 1-3 (e.g., NMS 116 and rogue policy analysis engine 118 (including, if applicable, rogue snapshot engine 208 and rogue rule auto-profiler engine 210) and their associated storage devices 200) may be implemented, at least in part, using one or more computing devices. As another example, all or any portion of the methods shown in FIGS. 4-6 may be implemented, at least in part, using one or more computing devices.

Computing device 700 may include one or more computer processors 702, non-persistent storage 704 (e.g., volatile memory, such as random access memory (RAM), cache memory, etc.), persistent storage 706 (e.g., a hard disk, an optical drive such as a compact disk (CD) drive or digital versatile disk (DVD) drive, a flash memory, etc.), a communication interface 712 (e.g., Bluetooth interface, infrared interface, network interface, optical interface, etc.), input devices 710, output devices 708, and numerous other elements and functionalities. Each of these components is described below.

In certain embodiments, computer processor(s) 702 may be an integrated circuit for processing instructions. For example, computer processor(s) may be one or more cores or micro-cores of a processor. Processor 702 may be a general-purpose processor configured to execute program code included in software executing on computing device 700. Processor 702 may be a special purpose processor where certain instructions are incorporated into the processor design. Although only one processor 702 is shown in FIG. 7, computing device 700 may include any number of processors.

Computing device 700 may also include one or more input devices 710, such as a touchscreen, keyboard, mouse, microphone, touchpad, electronic pen, motion sensor, or any other type of input device. Input devices 710 may allow a user to interact with computing device 700. In certain embodiments, computing device 700 may include one or more output devices 708, such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to computer processor(s) 702, non-persistent storage 704, and persistent storage 706. Many different types of computing devices exist, and the aforementioned input and output device(s) may take other forms. In some instances, multimodal systems can allow a user to provide multiple types of input/output to communicate with computing device 700.

Further, communication interface 712 may facilitate connecting computing device 700 to a network (e.g., a LAN, WAN) such as the Internet, mobile network, or any other type of network) and/or to another device, such as another computing device. Communication interface 712 may perform or facilitate receipt and/or transmission wired or wireless communications using wired and/or wireless transceivers, including those making use of an audio jack/plug, a microphone jack/plug, a universal serial bus (USB) port/ plug, an Apple® Lightning® port/plug, an Ethernet port/plug, a fiber optic port/plug, a proprietary wired port/plug, a Bluetooth® wireless signal transfer, a BLE wireless signal transfer, an IBEACON® wireless signal transfer, an RFID wireless signal transfer, near-field communications (NFC) wireless signal transfer, dedicated short range communication (DSRC) wireless signal transfer, 802.11 Wi-Fi wireless signal transfer, WLAN signal transfer, Visible Light Communication (VLC), Worldwide Interoperability for Microwave Access (WiMAX), IR communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 712 may also include one or more Global Navigation Satellite System (GNSS) receivers or transceivers that are used to determine a location of the computing device 700 based on receipt of one or more signals from one or more satellites associated with one or more GNSS systems. GNSS systems include, but are not limited to, the US-based GPS, the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

The term computer-readable medium includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as CD or DVD, flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

All or any portion of the components of computing device 700 may be implemented in circuitry. For example, the components can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Certain embodiments may include none, some, or all of the following technical advantages.

Certain embodiments may evaluate active rogue classification policies, such as those employed by an NMS to classify detected electronic devices, on an ongoing basis, using periodic snapshots of rogue classification information, and through analysis performed using various statistical machine learning algorithms. These snapshots and statistical machine learning algorithms may consider complex combinations of attribute values for attributes of devices detected in the network to evaluate whether a rogue classification assigned to an electronic device is the optimal rogue classification device to assign to that electronic device. This evaluation may reveal less than optimal assignments of rogue classifications, and thereby potential problems with active rogue classification policies.

Certain embodiments may improve the accuracy of rogue classification policies employed by an NMS. For example, based on the evaluation of the active rogue classification policies, certain embodiments provide an ability to automatically, and on an ongoing basis, generate recommended rogue classification policies designed to improve rogue classification based on an ongoing analysis of rogue classifications performed using active rogue classification policies. Certain embodiments may provide some or all of the recommended rogue classification policies to a network administrator or other user for review, configuration (if appropriate), and potential deployment. Additionally or alternatively, certain embodiments provide an ability to automatically deploy some or all of the recommended rogue classification policies for use as part of future active rogue classification policies, with little to no intervention from a user, such as a network administrator. Certain embodiments provide an ability to automatically deploy some or all of the recommended rogue classification policies for use as part of future active rogue classification policies, with little to no intervention from a network administrator or other user, thus automatically improving rogue classification capabilities of a communication network.

In view of all of the data that is considered and using the algorithms that are used to analyze the data, problems with active rogue classification policies may be detected that are otherwise difficult or impossible for a human user, such as a network administrator, to detect. Even if a highly-trained network administrator could identify some problems with active rogue classification policies, doing so requires significant training and time to understand and analyze the data, to the extent it even would be possible to do so. Furthermore, network administration tools often provide the network administrator limited ways to address the problem, such as selecting from predefined policies or making certain limited changes to the rules associated with the predefined policies.

Certain embodiments establish rogue classification policies that more quickly reach a more accurate rogue classification for electronic devices. For example, while it may be appropriate for a particular electronic device to be classified as a rogue or suspected rogue when the particular electronic device is detected initially, over time it may become clear that the particular device actually is not a rogue device. The improved rogue classification policies of this disclosure may reduce or eliminate the time to correctly classify the particular electronic device in a more benign rogue classification category. As another example, though a particular electronic device may be a rogue device, the particular electronic device may be misclassified initially in a benign rogue classification category; however, over time the behavior or other characteristics of the particular electronic device may make clear that the particular device actually is a rogue device. The improved rogue classification policies of this disclosure may reduce or eliminate the time to correctly classify the particular electronic device as a rogue device.

Improving rogue classification capabilities of electronic devices may improve the overall security of a communication network and may reduce the processing burden on electronic devices. For example, more accurately classifying rogue devices in a communication network may improve network security by identifying rogue devices that might have been misclassified in a more benign rogue classification under active rogue classification policies, by reducing or eliminating misclassifying of devices that pose little or no threat as rogues (thereby freeing up resources, whether human or computing, to address actual rogue devices), and/or by providing other benefits. As another example, more accurately classifying rogue devices in a communication network (or at least more quickly reaching a more accurate rogue classification) may reduce the processing burden on electronic devices by allowing those processing resources to be directed to electronic devices that are more likely to be a threat than electronic devices that pose little to no threat. Network administrators also may be able to focus on actual threats, potentially reducing their burden as well.

Example embodiments of this disclosure are summarized here. Other embodiments can also be understood from the entirety of the specification as well as the claims filed herein.

Example 1. In certain embodiments, a method includes obtaining, at a plurality of times by a processing device, rogue classification information for electronic devices detected within a communication network. The rogue classification information for each time of the plurality of times includes: timestamp information identifying the time of the plurality of times; corresponding sets of attribute values for the electronic devices detected within the communication network at the time; and respective rogue classifications, as determined according to active rogue classification policies and the corresponding sets of attribute values, for the electronic devices detected within the communication network at the time. The method includes analyzing, by the processing device, the rogue classification information for the plurality of times to determine whether to modify the active rogue classification policies. Analyzing the rogue classification information for the plurality of times includes analyzing, using a statistical machine learning algorithm, the respective rogue classifications and the corresponding sets of attribute values for the electronic devices for the plurality of times. The method includes generating, by the processing device in response to determining to modify the active rogue classification policies, a recommended rogue classification policy.

Example 2. The method of Example 1, where the active rogue classification policies include rules for classifying the electronic devices detected within the communication network into a rogue classification of a plurality of rogue classifications, the plurality of rogue classifications defining varying levels of a threat determined to be posed by an electronic device detected within the communication network.

Example 3. The method of any of Examples 1-2, where the corresponding attribute values for the electronic devices detected within the communication network include values for device attributes and activity attributes associated with the electronic devices detected within the communication network.

Example 4. The method of any of Examples 1-3, further including executing, prior to analyzing the rogue classification information, a pre-analysis of the rogue classification information to attempt to identify anomalies in the corresponding attribute values and to validate the respective rogue classifications, as determined according to the active rogue classification policies, for the electronic devices detected within the communication network.

Example 5. The method of any of Examples 1-4, where analyzing the rogue classification information includes assigning a threat rating to a particular electronic device, the threat rating being separate from the respective rogue classification for the particular electronic device and being determined according to at least a portion of the corresponding attribute values for the particular electronic device.

Example 6. The method of any of Examples 1-5, where analyzing the rogue classification information using the statistical machine learning algorithm includes: applying a data correlation algorithm to the corresponding attribute values for the electronic devices; and applying a data prediction algorithm to the corresponding attribute values for the electronic devices.

Example 7. The method of any of Examples 1-6, further including automatically deploying the recommended rogue classification policy on an electronic device to cause the electronic device to automatically incorporate the recommended rogue classification policy as an active rogue classification policy of the active rogue classification policies.

Example 8. The method of any of Examples 1-6, further including transmitting, by the processing device, the recommended rogue classification policy to a network manager for evaluation prior to deployment of the recommended rogue classification policy for incorporating the recommended rogue classification policy as an active rogue classification policy of the active rogue classification policies.

Example 9. The method of Example 8, where the recommended rogue classification policy is a template rogue classification policy that includes one or more fields for configuration, the recommended rogue classification policy including recommended values for the one or more fields.

Example 10. The method of any of Examples 1-9, where the recommended rogue classification policy includes a new rogue classification policy or an update to an active rogue classification policy.

Example 11. The method of any of Examples 1-10, where: the communication network is a WLAN; and the electronic devices include one or more of: a client device; a wireless access point; a WLAN controller; or a network switch.

Example 12. The method of Example 1, wherein the processing device includes a network management system.

Example 13. In certain embodiments, a computer system, includes one or more processors and one or more non-transitory computer-readable storage media storing programming for execution by the one or more processors. The programming includes instructions to obtain, at a plurality of times, rogue classification information for electronic devices detected within a communication network. The rogue classification information for each time of the plurality of times includes: timestamp information identifying the time of the plurality of times; corresponding sets of attribute values for the electronic devices detected within the communication network at the time; and respective rogue classifications, as determined according to active rogue classification policies and the corresponding sets of attribute values, for the electronic devices detected within the communication network at the time. The programming further includes instructions to analyze the rogue classification information for the plurality of times to determine whether to modify the active rogue classification policies. Analyzing the rogue classification information for the plurality of times includes analyzing, using a statistical machine learning algorithm, the respective rogue classifications and the corresponding sets of attribute values for the electronic devices for the plurality of times. The programming further includes instructions to generate, in response to determining to modify the active rogue classification policies, a recommended rogue classification policy.

Example 14. The computer system of Example 13, where the corresponding attribute values for the electronic devices detected within the communication network include values for device attributes and activity attributes associated with the electronic devices detected within the communication network.

Example 15. The computer system of any of Examples 13-14, where the programming further includes instructions to execute, prior to analyzing the rogue classification information, a pre-analysis of the rogue classification information to attempt to identify anomalies in the corresponding attribute values and to validate the respective rogue classifications, as determined according to the active rogue classification policies, for the electronic devices detected within the communication network.

Example 16. The computer system of any of Examples 13-15, where analyzing the rogue classification information includes assigning a threat rating to a particular electronic device, the threat rating being separate from the respective rogue classification for the particular electronic device and being determined according to at least a portion of the corresponding attribute values for the particular electronic device.

Example 17. The computer system of any of Examples 13-16, where analyzing the rogue classification information using the statistical machine learning algorithm includes: analyzing the corresponding attribute values for the electronic devices using a data correlation algorithm; and analyzing the corresponding attribute values for the electronic devices using a data prediction algorithm.

Example 18. The computer system of any of Examples 13-17, where the programming further includes instructions to automatically deploy the recommended rogue classification policy on an electronic device to cause the electronic device to automatically incorporate the recommended rogue classification policy as an active rogue classification policy of the active rogue classification policies.

Example 19. The computer system of any of Examples 13-17, where the programming further includes instructions to transmit the recommended rogue classification policy to a network manager for evaluation prior to deployment of the recommended rogue classification policy for incorporating the recommended rogue classification policy as an active rogue classification policy of the active rogue classification policies.

Example 20. In certain embodiments, one or more non-transitory computer-readable storage media stores programming for execution by one or more processors. The programming includes instructions to obtain, at a plurality of times, rogue classification information for electronic devices detected within a communication network. The rogue classification information for each time of the plurality of times includes: timestamp information identifying the time of the plurality of times; corresponding sets of attribute values for the electronic devices detected within the communication network at the time; and respective rogue classifications, as determined according to active rogue classification policies and the corresponding sets of attribute values, for the electronic devices detected within the communication network at the time. The programming further includes instructions to analyze the rogue classification information for the plurality of times to determine whether to modify the active rogue classification policies. Analyzing the rogue classification information for the plurality of times includes analyzing, using a statistical machine learning algorithm, the respective rogue classifications and the corresponding sets of attribute values for the electronic devices for the plurality of times. The programming further includes instructions to generate, in response to determining to modify the active rogue classification policies, a recommended rogue classification policy.

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A method comprising:

obtaining, at a plurality of times by a processing device, rogue classification information for electronic devices detected within a communication network, the rogue classification information for each time of the plurality of times comprising:

timestamp information identifying the time of the plurality of times;

corresponding sets of attribute values for the electronic devices detected within the communication network at the time; and respective rogue classifications, as determined according to active rogue classification policies and the corresponding sets of attribute values, for the electronic devices detected within the communication network at the time;

analyzing, by the processing device, the rogue classification information for the plurality of times to determine whether to modify the active rogue classification policies, wherein analyzing the rogue classification information for the plurality of times comprises analyzing, using a statistical machine learning algorithm, the respective rogue classifications and the corresponding sets of attribute values for the electronic devices for the plurality of times, and wherein analyzing the rogue classification information comprises assigning a threat rating to a particular electronic device, the threat rating being separate from the respective roque classification for the particular electronic device and being determined according to at least a portion of the corresponding attribute values for the particular electronic device; and generating, by the processing device in response to determining to modify the active rogue classification policies, a recommended rogue classification policy.

2. The method of claim 1, wherein the active rogue classification policies comprise rules for classifying the electronic devices detected within the communication network into a rogue classification of a plurality of rogue classifications, the plurality of rogue classifications defining varying levels of a threat determined to be posed by an electronic device detected within the communication network.

3. The method of claim 1, wherein the corresponding attribute values for the electronic devices detected within the communication network comprise values for device attributes and activity attributes associated with the electronic devices detected within the communication network.

4. The method of claim 1, further comprising executing, prior to analyzing the rogue classification information, a pre-analysis of the rogue classification information to attempt to identify anomalies in the corresponding attribute values and to validate the respective rogue classifications, as determined according to the active rogue classification policies, for the electronic devices detected within the communication network.

5. The method of claim 1, wherein analyzing the rogue classification information using the statistical machine learning algorithm comprises:

applying a data correlation algorithm to the corresponding attribute values for the electronic devices; and applying a data prediction algorithm to the corresponding attribute values for the electronic devices.

6. The method of claim 1, further comprising automatically deploying the recommended rogue classification policy on an electronic device to cause the electronic device to automatically incorporate the recommended rogue classification policy as an active rogue classification policy of the active rogue classification policies.

7. The method of claim 1, further comprising transmitting, by the processing device, the recommended rogue classification policy to a network manager for evaluation prior to deployment of the recommended rogue classification policy for incorporating the recommended rogue classification policy as an active rogue classification policy of the active rogue classification policies.

8. The method of claim 7, wherein the recommended rogue classification policy is a template rogue classification policy that includes one or more fields for configuration, the recommended rogue classification policy comprising recommended values for the one or more fields.

9. The method of claim 1, wherein the recommended rogue classification policy comprises a new rogue classification policy or an update to an active rogue classification policy.

10. The method of claim 1, wherein:

the communication network is a wireless local area network (WLAN); and the electronic devices comprise one or more of:

a client device;

a wireless access point;

a WLAN controller; or a network switch.

11. The method of claim 1, wherein the processing device comprises a network management system.

12. A computer system, comprising:

one or more processors; and one or more non-transitory computer-readable storage media storing programming for execution by the one or more processors, the programming comprising instructions to:

obtain, at a plurality of times, rogue classification information for electronic devices detected within a communication network, the rogue classification information for each time of the plurality of times comprising:

timestamp information identifying the time of the plurality of times;

corresponding sets of attribute values for the electronic devices detected within the communication network at the time; and respective rogue classifications, as determined according to active rogue classification policies and the corresponding sets of attribute values, for the electronic devices detected within the communication network at the time;

analyze the rogue classification information for the plurality of times to determine whether to modify the active rogue classification policies, wherein analyzing the rogue classification information for the plurality of times comprises analyzing, using a statistical machine learning algorithm, the respective rogue classifications and the corresponding sets of attribute values for the electronic devices for the plurality of times;

generate, in response to determining to modify the active rogue classification policies, a recommended rogue classification policy; and transmit the recommended rogue classification policy to a network manager for evaluation prior to deployment of the recommended rogue classification policy for incorporating the recommended rogue classification policy as an active roque classification policy of the active rogue classification policies.

13. The computer system of claim 12, wherein the corresponding attribute values for the electronic devices detected within the communication network comprise values for device attributes and activity attributes associated with the electronic devices detected within the communication network.

14. The computer system of claim 12, wherein the programming further comprises instructions to execute, prior to analyzing the rogue classification information, a pre-analysis of the rogue classification information to attempt to identify anomalies in the corresponding attribute values and to validate the respective rogue classifications, as determined according to the active rogue classification policies, for the electronic devices detected within the communication network.

15. The computer system of claim 12, wherein analyzing the rogue classification information comprises assigning a threat rating to a particular electronic device, the threat rating being separate from the respective rogue classification for the particular electronic device and being determined according to at least a portion of the corresponding attribute values for the particular electronic device.

16. The computer system of claim 12, wherein analyzing the rogue classification information using the statistical machine learning algorithm comprises:

analyzing the corresponding attribute values for the electronic devices using a data correlation algorithm; and
analyzing the corresponding attribute values for the electronic devices using a data prediction algorithm.

17. The computer system of claim 12, wherein the programming further comprises instructions to automatically deploy the recommended rogue classification policy on an electronic device to cause the electronic device to automatically incorporate the recommended rogue classification policy as an active rogue classification policy of the active rogue classification policies.

18. One or more non-transitory computer-readable storage media storing programming for execution by one or more processors, the programming comprising instructions to:

obtain, at a plurality of times, rogue classification information for electronic devices detected within a communication network, the rogue classification information for each time of the plurality of times comprising:

timestamp information identifying the time of the plurality of times;

corresponding sets of attribute values for the electronic devices detected within the communication network at the time; and respective rogue classifications, as determined according to active rogue classification policies and the corresponding sets of attribute values, for the electronic devices detected within the communication network at the time;

analyze the rogue classification information for the plurality of times to determine whether to modify the active rogue classification policies, wherein analyzing the rogue classification information for the plurality of times comprises analyzing, using a statistical machine learning algorithm, the respective rogue classifications and the corresponding sets of attribute values for the electronic devices for the plurality of times; and generate, in response to determining to modify the active rogue classification policies, a recommended rogue classification policy, wherein analyzing the rogue classification information using the statistical machine learning algorithm comprises:

analyzing the corresponding attribute values for the electronic devices using a data correlation algorithm; and analyzing the corresponding attribute values for the electronic devices using a data prediction algorithm.

19. The one or more non-transitory computer-readable storage media of claim 18, wherein the programming further comprises instructions to assign a threat rating to a particular electronic device, the threat rating being separate from the respective rogue classification for the particular electronic device and being determined according to at least a portion of the corresponding attribute values for the particular electronic device.

20. The one or more non-transitory computer-readable storage media of claim 18, wherein the programming further comprises instructions to transmit the recommended rogue classification policy to a network manager for evaluation prior to deployment of the recommended rogue classification policy for incorporating the recommended rogue classification policy as an active rogue classification policy of the active rogue classification policies.

* * * * *